(12) United States Patent
Endou et al.

(10) Patent No.: US 6,948,123 B2
(45) Date of Patent: Sep. 20, 2005

(54) MULTIMEDIA INFORMATION ARRANGING APPARATUS AND ARRANGING METHOD

(75) Inventors: Susumu Endou, Kawasaki (JP); Naoki Sashida, Kawasaki (JP); Daiki Masumoto, Kawasaki (JP); Shigemi Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 674 days.

(21) Appl. No.: 10/101,272

(22) Filed: Mar. 20, 2002

(65) Prior Publication Data

US 2002/0105541 A1 Aug. 8, 2002

Related U.S. Application Data

(63) Continuation of application No. PCT/JP00/06684, filed on Sep. 27, 2000.

(30) Foreign Application Priority Data

Oct. 27, 1999 (JP) .................................. PCT/JP99/05950

(51) Int. Cl.[7] ................................................. G09G 5/00
(52) U.S. Cl. ......................... 715/700; 715/968; 707/6; 707/104.1
(58) Field of Search ............................... 715/700, 968; 707/3, 6, 7, 102, 104.1; 382/305

(56) References Cited

U.S. PATENT DOCUMENTS

| | | | | |
|---|---|---|---|---|
| 5,829,044 A | * | 10/1998 | Sono | 711/156 |
| 5,915,038 A | * | 6/1999 | Abdel-Mottaleb et al. | 382/209 |
| 5,918,223 A | * | 6/1999 | Blum et al. | 707/1 |
| 6,253,218 B1 | * | 6/2001 | Aoki et al. | 715/526 |
| 2003/0097377 A1 | * | 5/2003 | Yahara et al. | 707/200 |

FOREIGN PATENT DOCUMENTS

| | | |
|---|---|---|
| JP | 7-28687 | 1/1995 |
| JP | 9-259130 | 10/1997 |
| JP | 10-11463 | 1/1998 |

OTHER PUBLICATIONS

Hayakawa et al., "A Global Map of the WWW Auto–Generated from User's Access History", *Information Processing Society of Japan, Study report* (97–HI–70–3), vol. 97, No. 2, (Jan. 16, 1997), pp. 17–24.

(Continued)

*Primary Examiner*—John Cabeca
*Assistant Examiner*—Ting Zhou
(74) *Attorney, Agent, or Firm*—Staas & Halsey LLP

(57) ABSTRACT

A multimedia information arranging apparatus that utilizes various feature values contained in multimedia information, carries out a flexible retrieval and classification and displays the information in an information set arrangement space is provided.

An information set obtaining portion 10 obtains information sets. An axis setting portion 20 assigns the feature value of the media information to an information set arrangement space axis so as to set the information set arrangement space. A feature value extracting portion 30 extracts the feature value from each of the media information of the obtained information set, and an information set arranging portion 40 arranges the information sets in the information set arrangement space according to their feature values. An information displaying portion 50 displays the information set arrangement space in such a manner as to be seen from a predetermined display viewpoint. By seeing the display result, as necessary, the axis setting portion 20 resets the information set arrangement space axis using a different feature value, so that the information sets are rearranged and redisplayed in the information set arrangement space, and retrievals of different aspects are repeated.

14 Claims, 21 Drawing Sheets

OTHER PUBLICATIONS

Sano, Ryouchi, "Clustering and Visualizing of Web Documents Using Self–Organizing Map", *Information Processing Society of Japan, Study report* (98–DBS–116(1)–5), vol. 98, No. 57 (Jul. 8, 1998), pp. 33–40.

"Image and Impression Handing Using Symbolized Impression Space", *Information Processing Socieyt of Japan, Symposium Article*, vol. 96, No. 10, (Dec. 2, 1996), pp. 131–137.

Hatano, Kenji, "Dynamic Clustering and Movie Asset Retrieval for Video Databases", *Information Processing Society of Japan, Study report*, (96–DBS–109–18), vol. 96, No. 68, (Jul. 24, 1996), pp. 105–110.

Sato, Kosuke, "Content–Based Color Image Retrieval for Sense Information Processing", *Fuzzy System Symposium Article*, vol. 12, (Jun. 4, 1996), pp. 379–380.

Musha, Yoshinori, et al., "A user Interface Visualizing Feature Space for Content–Based Image Retrieval", Technical Report of IEICE, IE98–49, PRMU98–72, MVE98–72 (Jul. 1998).

* cited by examiner

MULTIMEDIA INFORMATION ARRANGING APPARATUS AND ARRANGING METHOD

This application is a continuing appilcation, filed under 35 U.S.C. §111(a), of International Application PCT/JP900/06684, filed Sep. 27, 2000, it being further noted that foreign priority benefit is based upon PCT Patent Application PCT/JP99/05950, filed Oct. 27, 1999.

TECHNICAL FIELD

The present invention relates to a multimedia information arranging apparatus that can arrange efficiently and flexibly a multimedia information group, in which not only text information but also image information and audio information are mixedly present as various media information. It also is possible to arrange a multimedia information group that is present accessibly on the World Wide Web (hereinafter, abbreviated as WWW) of the internet.

BACKGROUND ART

Currently, there is a large amount of stored and accessible multimedia data including not only text information but also image information and audio information. In particular, accompanying the development of the internet, the amount of information on the WWW (World Wide Web) has been increasing steadily, so that there is a large amount of various kinds of stored and accessible multimedia data including the text information, the image information and the audio information. As a result, it has become increasingly difficult to retrieve necessary information accurately from the WWW.

Conventionally known information retrieval systems on the WWW and information arranging operations therein are described in the following.

First, a text key retrieval system is known. With respect to multimedia data to be a retrieval target, one or more pieces of text information representing their contents are assigned suitably. When retrieving the data, a text such as a word is specified as a retrieval key, whereby the text key retrieval system retrieves the multimedia data to which text information that is the same as this retrieval key has been assigned. In the case where the media information to be a retrieval target is text information, since the contents of the text information are retrieved by a text key, such a text key retrieval generally is carried out in an appropriate manner. In this text key retrieval system, the information can be arranged, for example, by sorting the data that have been hit in the retrieval and displaying a list thereof.

Second, a full-text retrieval system is known. This retrieval system is particularly effective when multimedia data to be a retrieval target are pieces of text information. There are several suggested methods therefor. For example, as a preprocessing, all the words representing features of the contents of the full text are extracted automatically from the full text, and a retrieval key file is generated so that these words are assigned thereto. When retrieving the data, a text such as a word is specified as a retrieval key, thereby detecting the text information whose retrieval key file contains a text that is the same as this retrieval key. With this method, like the first retrieval method using the text as a key, media information other than the text information, for example, the image information, is difficult to retrieve appropriately by using the text as a key, unless a suitable text key is assigned to each piece of the image information.

In this full-text retrieval system, the information also can be arranged, for example, by sorting the data that have been hit in the retrieval and displaying a list thereof, as in the text key retrieval system.

Third, as a method for retrieving the image information, further known is an image retrieval method of image pattern matching by specifying a part of an image and using the partial image as a retrieval key. With this image retrieval method, the image information having the specified partial image can be retrieved.

In this image retrieval system of image pattern matching, the information also can be arranged, for example, by sorting the data that have been hit in the retrieval and displaying a list thereof.

However, the conventional information retrieval systems on the WWW do not involve an effective retrieval method for the media information other than the text information, for example, the image information and the audio information.

With the firstly-described conventional text key retrieval system, it is difficult to retrieve the image information and the audio information appropriately. In other words, even if a plurality of keywords are assigned to one piece of image information, it is still difficult to carry out an appropriate and flexible image retrieval by the keywords in accordance with a searcher's intention because of the difficulty in representing the feature of the image accurately and flexibly with the text. Even when the retrieval is carried out indirectly using a text retrieval server or the like, the resultant information is not very useful. Although it is possible to collect a lot of images and display them sequentially, there has been a problem in that too many images would make it difficult to find an intended image.

With the secondly-described conventional full-text retrieval system, it is difficult to retrieve the image information and the audio information appropriately as in the first text key retrieval system. In other words, since the image information and the audio information originally do not have text information, no text information extraction can be expected therefrom.

With the thirdly-described conventional image retrieval system of image pattern matching, it is possible to retrieve the image information having a specified partial image. However, a searcher has to prepare and specify a partial image contained in the image that he/she wants to retrieve. This makes it difficult to retrieve the image information because what kind of partial image is contained in the image that he/she wants to retrieve the most is not clear in some cases and a partial image used for the retrieval cannot always be prepared. Moreover, a searcher sometimes does not know clearly the image that he/she wants to retrieve. In other words, there are some cases where a searcher can specify a general content of the image that he/she wants to retrieve but cannot specify the image itself even partially. There also are cases where a searcher just wants to carry out a trial-and-error retrieval to find out any usable image indeterminately. In such cases, matching only partial images is not flexible enough and, therefore, insufficient.

DISCLOSURE OF INVENTION

It is an object of the present invention to provide a multimedia information arranging apparatus that can retrieve multimedia information such as text information, image information and audio information efficiently and flexibly by utilizing various feature values contained in the multimedia information and arrange and display the retrieval result visually and understandably. In particular, it is an object of the present invention to provide a multimedia information arranging apparatus that can retrieve multimedia information on the WWW efficiently and flexibly and arrange this information.

It is a further object of the present invention to provide a multimedia information arranging apparatus in which a searcher can narrow down desired multimedia information flexibly based on the above-mentioned displayed retrieval result in an interactive manner and carry out one retrieval after another by a further aspect based on the retrieved multimedia information.

In order to achieve the above-mentioned objects, a multimedia information arranging apparatus of the present invention uses an information set as a processing unit. The information set is formed by grouping together the pieces of media information that are related to a same target, the media information being of a same kind and different kinds, from among a group of pieces of media information including image information, text information and audio information. Using the information set of the present invention as a processing unit as above is clearly different from a conventional multimedia processing. The conventional multimedia processing mainly refers to the following two processings. The conventional multimedia processing first means that one apparatus can deal with a plurality of media, which are image information, text information and audio information. In this case, although one apparatus can deal with a plurality of media, the processing unit itself is directed to each piece of media information. That is, each piece of the media information such as the image information, the text information and the audio information is processed individually. The conventional multimedia processing secondly means that the processing unit itself is multimedia data into which a plurality of media have been integrated. In this case, the image information and the audio information are embedded or a link thereof is provided in the text information, for example. That is, the data themselves are integrally processed. On the other hand, the information set of the present invention formed by associating with each other related pieces of media information such as the image information, the text information and the audio information, the media information being of the same kind and different kinds, is used as a processing unit and is different from the case where each piece of media information is processed individually as in the firstly-described conventional multimedia information. Furthermore, although data of plural pieces of media information are associated so as to be a set in the present invention, the data of the plural pieces of media themselves are not integrally processed unlike the secondly-described conventional multimedia information, but rather each piece of the media information is maintained as they are collected and obtained.

The multimedia information arranging apparatus of the present invention includes an information set obtaining portion for obtaining pieces of media information in units of information sets described above, an axis setting portion for assigning an attribute of a feature value extracted from the obtained pieces of media information contained in the information sets to an axis of a space in which a group of the information sets is arranged and setting an information set arrangement space with one or more axes, a feature value extracting portion for extracting a component of the feature value from the pieces of media information in the information sets, an information set arranging portion for arranging the information sets in the information set arrangement space based on the attribute of the feature value of the pieces of media information contained in the information sets and the component of this feature value, and an information displaying portion for displaying pieces of media information corresponding to a viewpoint with respect to the information set arrangement space, from among the pieces of media information of the information sets arranged in the information set arrangement space.

With the above configuration, it is possible to collect and obtain efficiently multimedia information such as text information, image information and audio information on the WWW as an information set, retrieve it efficiently and flexibly by utilizing various feature values and display the retrieval result visually and understandably in an information set arrangement space.

Next, in the multimedia information arranging apparatus described above, in the axis setting portion, a plurality of the attributes of the feature values can be assigned in combination to one axis of the space or one attribute of the feature value can be assigned to a plurality of the axes.

In the generation of the information set, the information set obtaining portion includes an information collecting portion for collecting the pieces of media information including the image information, the text information and the audio information, a relationship analyzing portion for analyzing a relationship between the collected pieces of media information and an information set generating portion for grouping and editing the related pieces of media information, which is of the same kind or the different kinds, as the information sets, so that the group of the related pieces of media information may be formed into the information set. Of course, the information sets that have been generated already may be read from a recording medium such as a CD-ROM by an information set input portion or collected from a network by an information set collecting portion. By grouping together the related pieces of media information into the information sets as described above, the text information and the audio information can be associated with the image information. Therefore, when carrying out a retrieval using a feature value regarding the audio information and that regarding the text information, for example, the image information that is associated with them also can be obtained at the same time.

Also, the feature value to be used can be a DCT coefficient feature value with respect to the image information, a wavelet transform coefficient feature value with respect to the image information or a HSI color histogram feature value with respect to the image information. It can be a feature value representing a presence of a specific word with respect to the text information or a feature value of how many times a specific word is used with respect to the text information. It can be a voice frequency feature value with respect to the audio information, an amplitude feature value with respect to the audio information or a time change feature value with respect to the audio information.

Then, in the multimedia information arranging apparatus described above, it is preferable that the axis setting portion has an axis resetting function of resetting an assignment of the attribute of the feature value to each of the axes of the information set arrangement space and resetting the information set arrangement space with one or more axes, and the feature value extracting portion extracts the component of the feature value based on the axis-resetting by the axis setting portion, the information set arranging portion arranges the information sets in the information set arrangement space based on the component of the extracted feature value, and the information displaying portion displays the pieces of media information corresponding to the viewpoint with respect to the reset information set arrangement space.

With the above configuration, after seeing the result of the retrieval executed by a searcher, it is possible to narrow down information flexibly by carrying out another retrieval in an interactive manner and carry out one retrieval after another by a further aspect using the reset information set arrangement space axes. In other words, the searcher can see the retrieval result, reset the axis of the information set arrangement space by specifying another feature value, rearrange and redisplay the information sets using the information set arrangement space whose axes have been reset, by trial and error.

Next, in the multimedia information arranging apparatus described above, it is preferable that the axis setting portion resets an assignment of the attribute of the feature value to each of the axis of the information set arrangement space and resets the information set arrangement space that has been displayed already, the information set arranging portion rearranges the information sets in the reset information set arrangement space, and when displaying how the information sets are rearranged, the information displaying portion moves the displayed pieces of media information at predetermined intervals from a position at which the information sets have been located before the rearrangement to a position at which they are to be located thereafter.

With the above configuration, when resetting the information set arrangement space and reclassifying the information sets, it is possible to recognize visually how the arrangement position of each information set changes, thus improving convenience of retrieval and classification operation of the information set.

Furthermore, in the multimedia information arranging apparatus described above, it is preferable that the information set arranging portion has a function of fixing an information set selected by a user to a specific position in an information set arrangement space specified by the user, and a function of fixing the information set selected by the user to the specific position while rearranging only the other information sets according to the information set arrangement space, when rearranging the information sets with respect to the information set arrangement space with reset axis.

With the above configuration, since the display position of a target information set is fixed to a specific position, it is easy to find the target information set. Also, since the target information set and information sets similar to the target information set in the feature value that is set to the axis are arranged close to each other, it becomes easier to grasp the relationship between the information sets. Furthermore, it is possible to execute a trial-and-error reclassification/redisplaying while focusing on a specific information set.

Next, a multimedia information arranging apparatus of the present invention can be realized using computers by recording a processing program of the multimedia information arranging apparatus of the present invention, on a computer-readable recording medium.

Then, a multimedia information arranging method of the present invention includes obtaining pieces of media information in units of information sets, each formed by associating with each other related pieces of media information including image information, text information and audio information, the media information being of a same kind and different kinds, assigning an attribute of a feature value extracted from the obtained pieces of media information contained in the information sets to an axis of a space in which a group of the information sets is arranged and setting an information set arrangement space with one or more axis, extracting a component of the feature value from the pieces of media information in the information sets, arranging the information sets in the information set arrangement space based on the attribute of the feature value of the pieces of media information contained in the information sets and the component of this feature value, specifying a feature value that is different from the feature value with respect to the arranged information sets, resetting an assignment to each of the axis of the information set arrangement space, and rearranging the information sets in the information set arrangement space based on the resetting, and setting the axis of the information set arrangement space and arranging the information sets in the information set arrangement space repeatedly while switching feature values to be used, thereby arranging the information sets.

With the above configuration, the multimedia information can be retrieved by setting the axis of the information set arrangement space and arranging the information sets in the information set arrangement space repeatedly while switching feature values to be used. In the conventional retrieval method, when a retrieval key that had been used was not sufficient for the retrieval narrowing-down, another retrieval was carried out by selecting indeterminately another retrieval key that belonged to the same kind and the same feature value. On the other hand, in the arranging method of the present invention, when a retrieval key that has been used is not sufficient for the retrieval narrowing-down, another retrieval can be carried out by selecting suitably a retrieval key that belongs to a different kind and a different feature value, allowing a more flexible and appropriate retrieval. In addition, since a retrieval key that belongs to a different kind and a different feature value is used as described above, it can be expected that a heuristically new retrieval result that a searcher has never expected can be obtained. For example, if a first retrieval is executed with a feature value representing a presence of a specific word with respect to the text information, and then these information sets are rearranged by combining a wavelet transform coefficient feature value and a HSI color histogram feature value with respect to the image information, it is possible to provide a new application of the retrieval system for discovering a tendency that has not been known conventionally, for example, information sets retrieved by a specific word tend to have specific partial shape and color.

BEST MODE FOR CARRYING OUT THE INVENTION

The following is a description of embodiments of a multimedia information arranging apparatus and an arranging method of the present invention, with reference to the accompanying drawings.

(First Embodiment)

A multimedia information arranging apparatus of a first embodiment of the present invention will be described. Considering a group of related pieces of media information including image information, text information and audio information as an information set, the multimedia information arranging apparatus of the first embodiment arranges such information sets in a preset information set arrangement space and displays the pieces of media information according to a viewpoint with respect to this information set arrangement space.

First, a concept of the information set, which serves as a unit of processing information used in the multimedia information arranging apparatus of the present invention, will be described. Next, an exemplary configuration of the multimedia information arranging apparatus of the first embodiment will be described, and then an operation sequence of the multimedia information arranging apparatus of the first embodiment will be described with reference to a flowchart.

Figure 1:
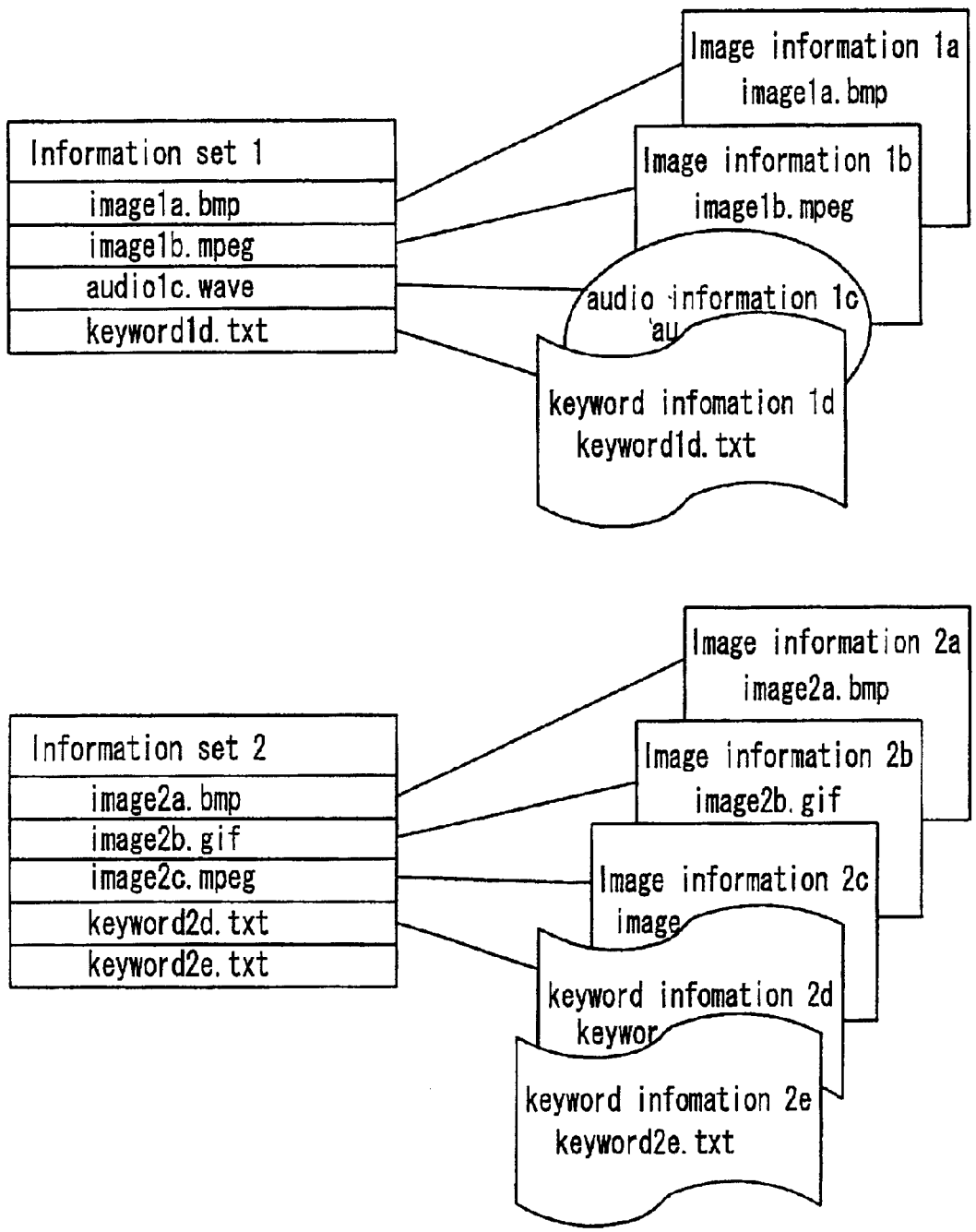
FIG. 1 is a drawing for describing a concept of an information set as a processing unit used in a multimedia information arranging apparatus of the present invention.

The multimedia information arranging apparatus of the present invention uses the information set as the unit of processing information. This information set is a processing unit obtained by associating with each other related pieces of media information such as image information, text information and audio information, the media information being of the same kind and different kinds. FIG. 1 is a schematic view showing this concept in a simplified manner. As shown in FIG. 1, in one information set 1, related pieces of media information, which is of the same kind or different kinds, are associated with each other. In the example of the information set 1, four pieces of media information of the same kind or different kinds, which are an image information $1a$ and an image information $1b$, an audio information $1c$ and a keyword information $1d$, are associated with each other. These four pieces of media information, which is of the same kind or different kinds, are collected based on a concept that these pieces of information are related to, for example, "a personal computer of Company F."

When associating image information and text information with each other as an information set, for example, from a HTML document on the WWW in which images and texts are mixedly present, an image part is extracted as the image information, texts around the image in the HTML document are extracted as the text information, and then they are associated with each other. As another example, when associating image information, audio information and text information in moving images with each other, from an XML file including movie data containing moving images and audio, a moving image part is extracted as the moving image information, audio data are extracted as the audio information, texts around parts in which the movie data are embedded are extracted as the text information, and then they are associated with each other. Alternatively, it may be possible to trace a link provided in HTML data to other data and extract image information, text information and audio information from the linked content so as to be an information set. Also, there can be cases not only where image information and text information are originally present in the form of one file as in the HTML document, but also where plural pieces of text information are associated with one piece of image information, or conversely, plural pieces of image information are associated with one text. In addition, URL (Universal Resource Locator) can be included as a part of the information set. By including URL as a part of the information set, it becomes possible to select an arranged information set and display a Web page including this information set based on that URL as described below.

One of the characteristics of this information set is that, while individual pieces of media information therein are not edited or processed so that image information is maintained as image information and audio information is maintained as audio information, each kind of feature values of the individual pieces of media information can be processed as a feature value of the entire information set. When arranging the information set based on a feature value as a processing unit as described below, each kind of feature values of the individual pieces of media information in the information set is processed as the feature value of the entire information set, thereby determining a position at which the information set is to be arranged. On the other hand, when displaying the information set as described below, in the case where an image is displayed on an XY plane of a display screen (where a Z axis corresponds to a depth direction), one or more pieces of image information of the information set are displayed at the display position. If text information is displayed on the XY plane of the display screen, one or more pieces of text information of the information set are displayed at the display position of the individual information set.

Using the information set of the present invention as a processing unit as above is clearly different from a conventional multimedia processing. The conventional multimedia processing mainly refers to the following two processings. The conventional multimedia processing first means that one apparatus can deal with a plurality of media, which are image information, text information and audio information. In this case, although one apparatus can deal with a plurality of media, the processing unit itself is directed to each piece of media information. That is, each piece of the media information such as the image information, the text information and the audio information is processed individually. The conventional multimedia processing secondly means that the processing unit itself is multimedia data into which a plurality of media have been integrated. In this case, the image information and the audio information are embedded or a link thereof is provided in the text information, for example. That is, the data themselves are integrally processed. On the other hand, the information set of the present invention formed by associating with each other related pieces of media information such as the image information, the text information and the audio information, the media information being of the same kind and different kinds, is used as a processing unit and is different from the case where each piece of media information is processed individually as in the firstly-described conventional multimedia information. Furthermore, although data of plural pieces of media information are associated so as to be a set in the present invention, the data of the plural pieces of media themselves are not integrally processed unlike the secondly-described conventional multimedia information, but rather each piece of the media information is maintained as they are collected and obtained. Also, it becomes possible to incorporate newly added media information into an existing information set related to this new information in a simplified manner or to form a new information set when there is no existing information set that is related to the new information. If the data of the plural pieces of media themselves are integrally processed as in the secondly-described conventional multimedia information, new media information cannot be added independently and easily.

Figure 2:
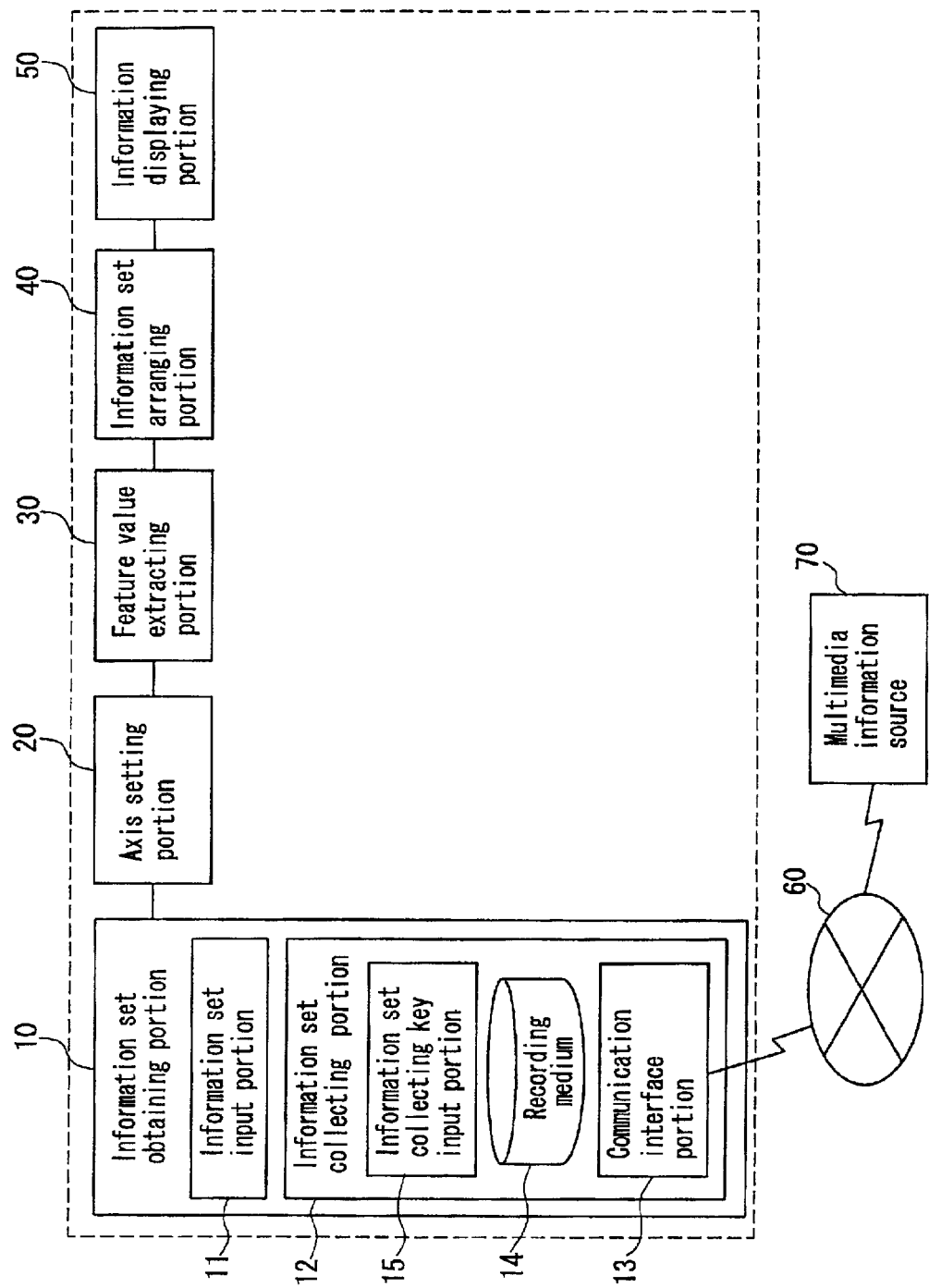
FIG. 2 is a drawing illustrating an exemplary configuration of a multimedia information arranging apparatus of a first embodiment according to the present invention.

Next, FIG. 2 shows an exemplary configuration of the multimedia information arranging apparatus of the first embodiment. As shown in FIG. 2, the multimedia information arranging apparatus includes an information set obtaining portion 10, an axis setting portion 20, a feature value extracting portion 30, an information set arranging portion 40 and an information displaying portion 50. Numeral 60 denotes an accessible network such as the internet, and a multimedia information source 70 is being accessible via the network 60. In the multimedia information source 70, various pieces of multimedia information such as image information, text information and audio information are stored. In this example, information sets, each of which is a group of related pieces of media information, are also stored.

In the exemplary configuration shown in FIG. 2, the information set obtaining portion 10 includes an information set input portion 11 and an information set collecting portion 12. The information set collecting portion 12 is a portion for collecting information sets, which collects information sets that are present in the multimedia information source 70 via the network 60. The information set input portion 11 can accept inputs of information sets directly from a recording medium such as a CD-ROM. As described above, the information set obtaining portion 10 suitably includes either or both of the information set input portion 11 and the information set collecting portion 12, thereby holding selectively a function of collecting information sets that are present in the multimedia information source 70 via the network 60 and a function of accepting inputs of information sets directly from a recording medium such as a CD-ROM.

An exemplary configuration of the information set collecting portion 12, which will be described in the first embodiment, includes a communication interface 13, a recording medium 14 such as a hard disk and an information set collecting key input portion 15. Communication is conducted with the multimedia information source 70 on the network 60 via the communication interface 13. The recording medium 14 can be used for storing the collected information sets. The information set collecting key input portion 15 specifies a collection range using a keyword at the time of collecting the information sets. When a large amount of information sets is stored in the multimedia information source 70 on the network, the amount of collected data becomes extremely large if information sets are collected without specifying any range. Thus, when a keyword is inputted through the information set collecting key input portion 15 so as to narrow down the range before collecting information sets, the information set collecting portion 12 collects the information sets having this keyword.

The axis setting portion 20 is a portion for setting information set arrangement space axes, which assigns a feature value extracted from each piece of the media information to each information set arrangement space axis and sets an information set arrangement space having one or more axes. For example, it specifies three axes of an X axis, a Y axis and a Z axis and sets the space defined by these X, Y and Z axes as the information set arrangement space. In the present embodiment, a display screen of the information displaying portion 50 described below corresponds to the XY plane and a depth direction thereof corresponds to the Z-axis direction, for example.

The feature value that is set as the information set arrangement space axis can be any feature value extractable according to media such as image information, text information and audio information.

For example, with respect to the image information, the feature value may be a DCT coefficient feature value, a wavelet transform coefficient feature value or a HSI color histogram feature value. By setting the DCT coefficient feature value as the information set arrangement space axis, it becomes possible to arrange the image information according to a feature of a spatial frequency component. By setting the wavelet transform coefficient feature value as the information set arrangement space axis, it becomes possible to arrange the image information according to a feature of a particularly low frequency portion of the spatial frequency, that is, a feature of a general outline of an object in the image. Although the wavelet transform also is a waveform/frequency transform as the DCT, it can be performed while maintaining positional (time) information. By setting the HSI color histogram feature value as the information set arrangement space axis, it becomes possible to arrange the information according to color information of the image. The HSI color histogram allows a better grasp of a feature of the image such as an extent to which a human skin region is included.

Also, for example, with respect to the text information, the feature value may be a feature value representing a presence of a specific word or a feature value of how many times a specific word is used. By setting the feature value representing the presence of a specific word or the feature value of how many times a specific word is used as the information set arrangement space axis, it becomes possible to arrange the text information containing a description of the specific word. When image information is associated with the text information in the information set, the image information represented by the specific word also is arranged in the information set arrangement space.

In addition, for example, with respect to the audio information, the feature value may be a voice frequency feature value, an audio amplitude feature value or an audio time change feature value. By setting the voice frequency feature value as the information set arrangement space axis, it becomes possible to arrange the audio information according to a feature of the voice frequency, that is, audio pitch and quality. The voice frequency makes it possible to indicate the feature of the audio information such as a difference in sounding objects and a difference between an animal bark, a male voice and a female voice, and with an improved accuracy, to indicate a difference in speakers. By setting the audio amplitude feature value or the time change feature value as the information set arrangement space axis, it becomes possible to arrange the audio information according to an audio volume.

The axis setting portion 20 also can assign a combination of a plurality of feature values to one space axis. When combining two or more feature values, units of these feature values have to be transformed and adjusted, and in such cases, they can be converted into points such as scores and then combined. For example, the case in which a specified color component of the HSI color histogram is contained at a ratio equal to or more than a threshold is expressed by "1," and otherwise by "0" as a first feature value, and the case in which there is a feature value representing the presence of a specific word in the text information is expressed by "1," and otherwise by "0" as a second feature value, whereby the first feature value and the second feature value can be combined and assigned to one space axis. Conversely, one feature value also can be assigned to a plurality of the axes. There are many methods for assigning one feature value to two or more axes, and one of them is to regard the feature value as a vector, select a plurality of dimensions of the vector that have a large variance and define these dimensions as the axes.

The feature value extracting portion 30 extracts a feature value from each of the media information of the information set. Although not shown in FIG. 2, the feature value extracting portion 30 has a function of extracting various feature values from the media information as described above. For example, it has a DCT coefficient feature value calculating function, a wavelet transform coefficient feature value calculating function and a HSI color histogram feature value calculating function as a function of extracting a feature value of the image information. For example, it has a function of detecting whether or not a specific word is present and a function of calculating how many times a specific word is used as a function of extracting a feature value of the text information. For example, it has a voice frequency feature value extracting function, an audio amplitude feature value extracting function and an audio time change feature value extracting function as a function of extracting a feature value of the audio information. By utilizing these functions, a feature value is extracted from each piece of the media information of the collected information set. Furthermore, the addition, update and deletion of the function of extracting the feature value from each piece of the media information are possible in the feature value extracting portion 30. When the feature value extracting function is provided as DSP (digital signal processor) or the like, the content can be replaced and added easily as necessary.

The information set arranging portion 40 arranges the information sets in the information set arrangement space based on the feature values extracted by the feature value extracting portion 30. For example, when the information set arrangement space is set by the three axes of X, Y and Z, the information sets are arranged in this three-dimensional information set arrangement space.

The information displaying portion 50 is a portion for displaying pieces of the media information in the information sets that have been arranged in the information set arrangement space by the information set arranging portion 40. The information displaying portion 50 displays pieces of the media information in the information set arrangement space from a direction according to a viewpoint with respect to the information set arrangement space. For example, when the XY plane is a front surface and the Z-axis direction is a depth direction in the information set arrangement space defined by the X, Y and Z axes, the media information is displayed such that the display screen corresponds to the XY plane and the depth direction of the screen corresponds to the Z-axis direction.

An example of the operation sequence of the multimedia information arranging apparatus of the first embodiment of the present invention configured as above will be described with reference to FIG. 3.

Figure 3:
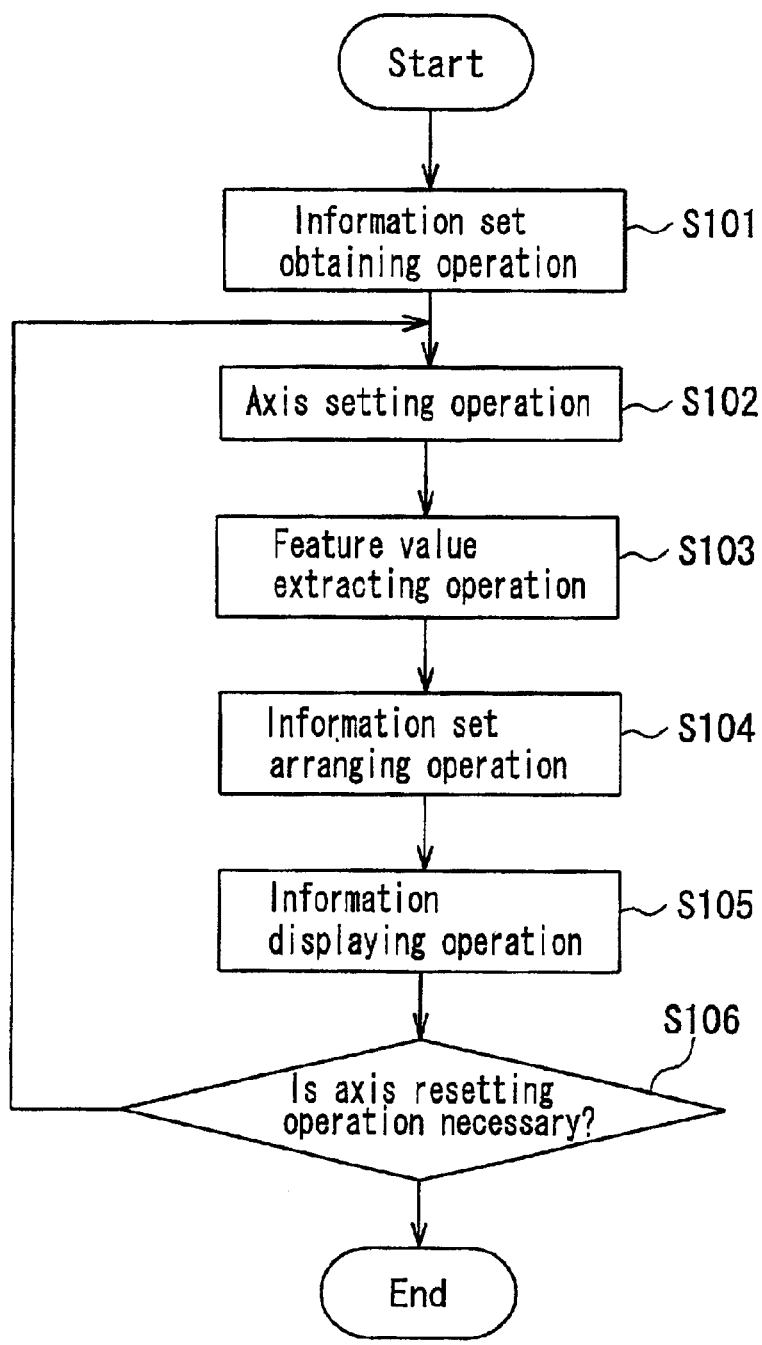
FIG. 3 is a flowchart showing an operation sequence of the multimedia information arranging apparatus of the first embodiment according to the present invention.

As shown in FIG. 3, the operation of the multimedia information arranging apparatus of the first embodiment of the present invention generally includes an information set obtaining operation (S101), an axis setting operation (S102) for setting a feature value to be assigned to an information set arrangement space axis and defining an information set arrangement space, a feature value extracting operation (S103) for extracting predetermined feature values from pieces of media information in the information sets, an information arranging operation (S104) for arranging the information sets in the information set arrangement space according to the extracted feature values, an information displaying operation (S105) for displaying the information set arrangement space and the information sets that have been arranged in the information set arrangement space from a set viewpoint, and an axis resetting operation (a loop to Operation S102) for seeing the displayed retrieval result, resetting the feature value to be assigned to the information set arrangement space axis and redefining the information set arrangement space, in order to narrow down further or continue retrieval from another aspect as necessary. When a desired retrieval result is obtained by arranging the information sets based on the information set arrangement space that has been set by the first axis setting operation (S102), the axis resetting operation does not have to be conducted. Although the above operation sequence presupposes that the information sets are present accessibly from the beginning, the multimedia information arranging apparatus may execute, as a preprocessing, an information set generating operation for grouping together related pieces of the media information including the image information, the text information and the audio information and defining/generating the information sets, as described in the second embodiment.

First, the multimedia information arranging apparatus of the present invention executes the information set obtaining operation (S101) by the information set obtaining portion 10. For example, the information set obtaining portion 10 collects information sets from the multimedia information source 70 on a WVW server or the like, which is accessible on the network 60 such as the internet, via the communication interface 13, thus obtaining the information sets. In this example, as the information set obtaining operation (S101), a plurality of the information sets in which image information and text information are associated with each other are obtained. Also, in order to narrow down the range of information sets to be obtained to a certain degree, only the information sets that are hit in a keyword retrieval may be obtained. In this example, the information sets that are hit by the keyword of "bag" were obtained.

Next, the multimedia information arranging apparatus executes the axis setting operation (S102) for setting a feature value to be assigned to the information set arrangement space axis and defining an information set arrangement space by the axis setting portion 20. The axis setting portion 20 executes the axis setting operation by setting the feature value to be assigned to each axis of the information set arrangement space among feature values extractable from the media information such as the DCT coefficient feature value with respect to the image information described above and defining the information set arrangement space. In this example, the wavelet transform coefficient feature value of the image information is assigned to an X axis (a horizontal direction), the HSI color histogram feature value is assigned to a Y axis (a vertical direction), and the feature value representing how many times a specific word is used in the text information is assigned to a Z axis (a depth direction). In the present description, the feature value representing the presence of a specific word, which is to be assigned to the Z axis, is the number of times that the word "bag" is used when collecting the information sets.

Then, the multimedia information arranging apparatus executes the feature value extracting operation (S103) for extracting the feature values that have been assigned to the space axes from the pieces of the media information in the collected information sets using the feature value extracting portion 30. As described above, although not shown in FIG. 2, the feature value extracting portion 30 has the wavelet transform coefficient feature value calculating function, the HSI color histogram feature value calculating function and the function of calculating how many times a specific word is used, and extracts the wavelet transform coefficient feature value, the HSI color histogram and the number of times that the specific word is used from the media information of the collected information sets.

Figure 4:
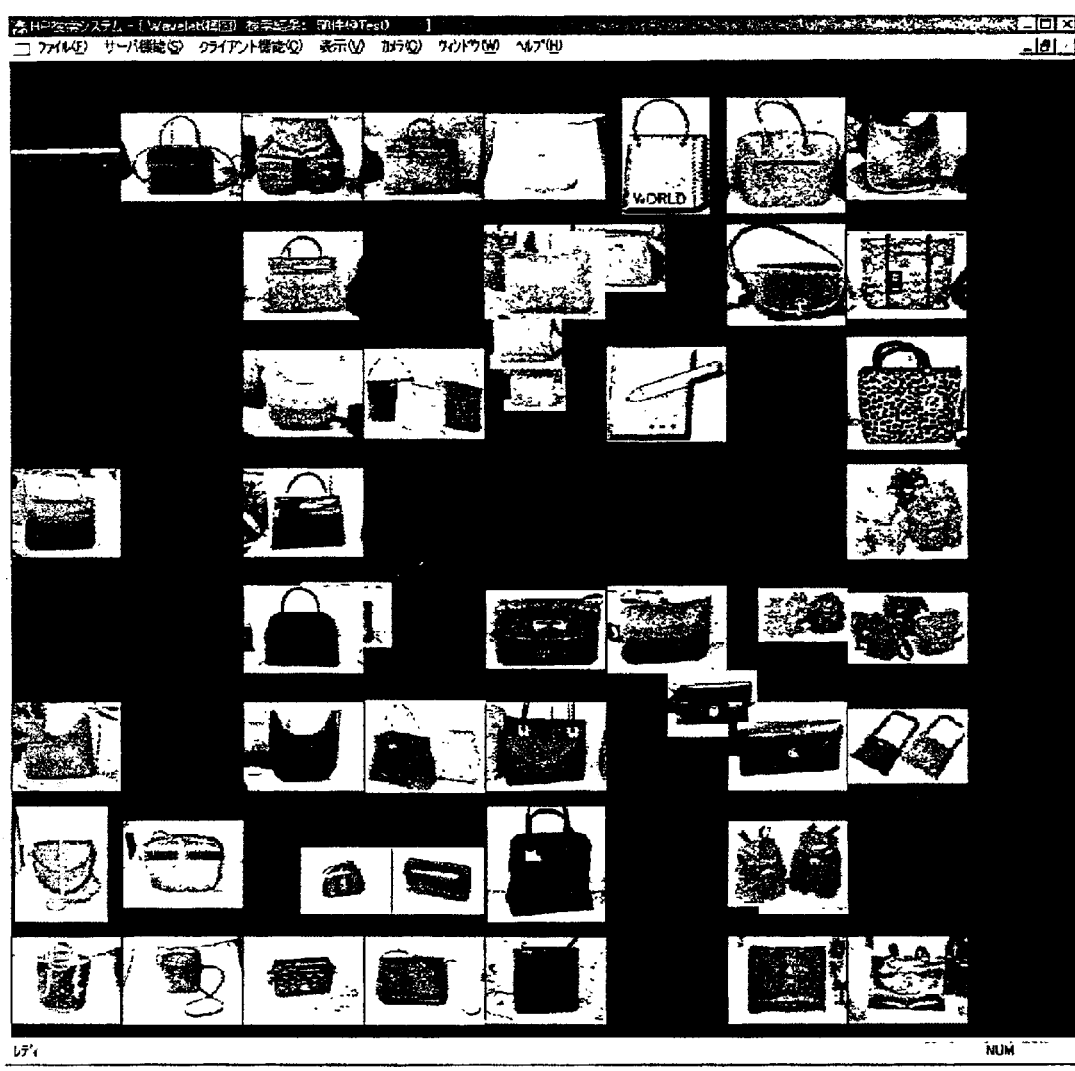
FIG. 4 is a photograph showing a display example when information sets collected with a keyword of "bag" are arranged in an information set arrangement space, in the multimedia information arranging apparatus of the first embodiment according to the present invention.

Subsequently, the multimedia information arranging apparatus executes the information arranging operation (S104) for arranging the information sets in the information set arrangement space according to the extracted feature values using the information set arranging portion 40. Then, it executes the information displaying operation (S105) for displaying the information set arrangement space and the information sets that have been arranged in the information set arrangement space from the set viewpoint by the information displaying portion 50. FIG. 4 shows an example of arranging the information sets collected by the keyword of "bag" in the set information set arrangement space. In this example, each information set is displayed such that the image information among the associated pieces of the media information is located at the front (the XY plane). Since the X axis is the wavelet transform coefficient feature value, bags with similar shapes are located in similar positions on the X coordinate. Since the Y axis is the HSI color histogram feature value, bags with similar colors are located in similar positions on the Y coordinate.

Figure 5:
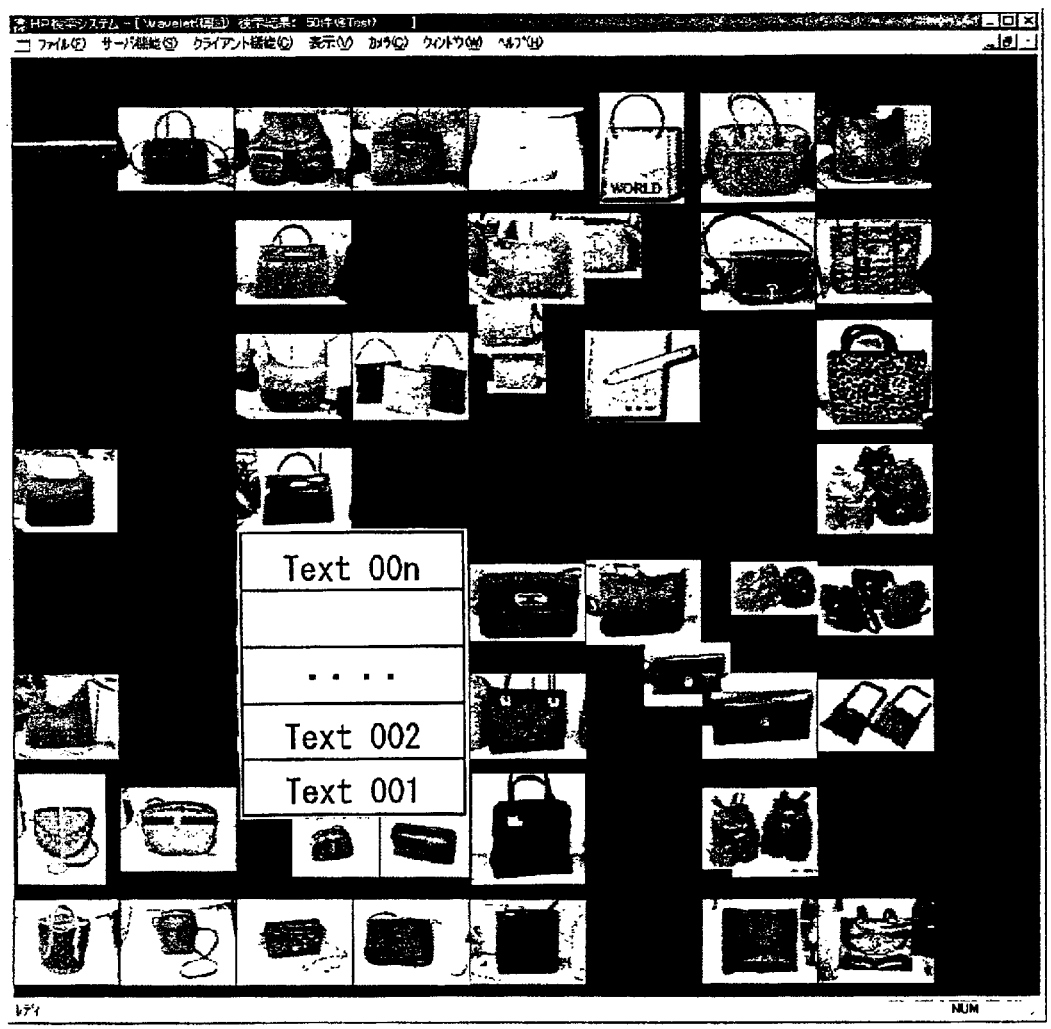
FIG. 5 is a photograph showing an example in which ID numbers of text information attached to image information in the information set arrangement space shown in FIG. 4 are displayed by a pull-down menu.
Figure 6:
FIG. 6 is a photograph showing an example in which an ID number of the text information is selected from the pull-down menu shown in FIG. 5 and then a corresponding text is displayed.

In some information sets that have been arranged in the information set arrangement space as shown in FIG. 4, plural pieces of the text information are associated. The image information displayed at the front in FIG. 4 is accompanied by text information. In this case, as shown in FIG. 5, when the image information on the information set arrangement space is clicked with a pointing device, ID numbers (for example, "text 1") of the accompanying text information are displayed by a pull-down menu. When an ID number of the text information is selected from the pull-down menu, a corresponding text is displayed as shown in FIG. 6.

Figure 7:
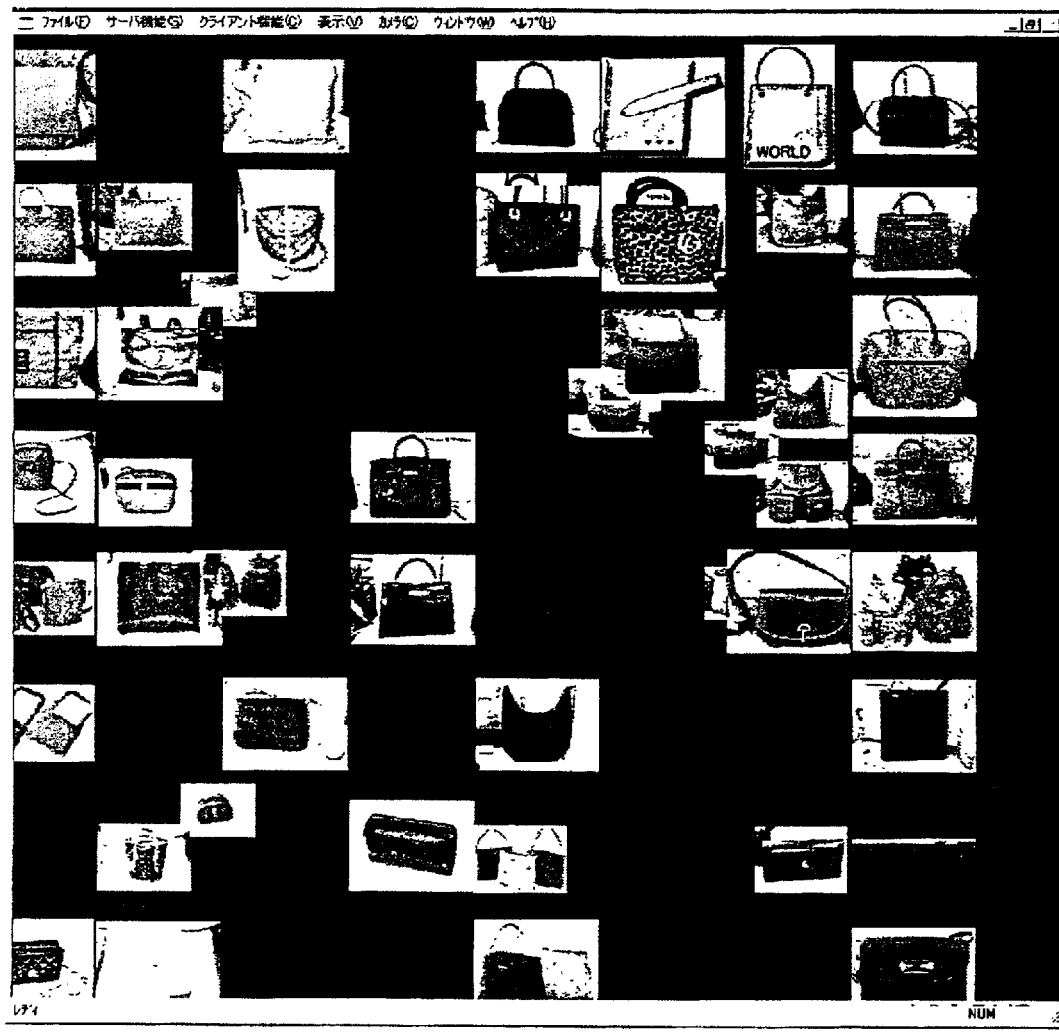
FIG. 7 is a photograph showing an example in which information set arrangement space axes are reset by an axis setting portion 20, feature values are extracted again, and then reclassification and redisplaying in this information set arrangement space are conducted.

According to the information set obtaining operation S101 to the information displaying operation S105 described above, the multimedia information arranging apparatus of the present invention can end the retrieval operation when desired image information is obtained, the initial object of the retrieval operation is achieved, and thus an axis resetting operation is not necessary (Operation S106: NO), while it can return along the loop to Operation S102 to perform the axis resetting operation when the initial object of the retrieval operation has not been achieved, and the axis resetting operation is necessary (Operation S106: YES). In other words, the multimedia information arranging apparatus executes the axis resetting operation of seeing the arranged result displayed in the information displaying operation S105, resetting the feature value to be assigned to the information set arrangement space axis by using the axis setting portion 20 and redefining the information set arrangement space, in order to narrow down further or continue retrieval from another aspect as necessary. As described above, until the needed image information is obtained, it resets the feature values to be assigned to the information set arrangement space axes (S102), extracts the reset feature values again from the pieces of the media information in the information sets (S103), rearrange the information sets in the information set arrangement space based on the newly extracted feature values (S104) and redisplays the information sets that have been rearranged in the information set arrangement space by the information displaying portion 50 (S105). For example, the axis setting portion 20 also can change the X axis from the wavelet transform coefficient feature value to the DCT coefficient feature value or change the Y axis from the HSI color histogram feature value to the voice frequency feature value as a totally different aspect. In this example, the X axis was changed from the wavelet transform coefficient feature value to the HSI color histogram feature value, and the Y axis was changed from the HSI color histogram feature value to the DCT coefficient feature value. FIG. 7 shows an example in which the axis setting portion 20 resets the information set arrangement space axes and extracts the feature values again, followed by reclassification and redisplaying in this information set arrangement space. A series of these axis resetting operations are repeated until a desired retrieval result is obtained.

As described above, it is possible to see the displayed arranged result of the information sets obtained with certain feature values and try another arrangement of the information sets using feature values with a completely different aspect, thus generating a possibility of discovering new information that a searcher has never expected.

It also is possible to see the displayed results as the arrangement of the information sets such as the image information and process the information as described below.

First, a Web page containing an information set selected from the arranged information sets can be displayed. If URL including the information set such as the image information also is stored in a part of the information set, in the case where this image information on the information displaying portion 50 is selected by a user, its Web page can be displayed based on the URL information. For example, image information is selected, and then a button of "Web page" in the menu is clicked with a pointing device, thereby displaying this Web page.

Figure 8:
FIG. 8 is a photograph showing an example in which pieces of image information similar to a key image are displayed as a similar image list.

Second, by seeing the arranged information sets so as to provide a retrieval key, information sets similar to this key can be displayed as a list. For example, with respect to the information sets arranged as in FIG. 4, a key image (an image to be a key for pattern matching) is provided as the retrieval key, and pieces of image information, which is considered similar to this key image by the pattern matching, are displayed as a similar image list. FIG. 8 shows this example. The similar image list is displayed with respect to the input key image. The example of FIG. 8 provides the key image as the retrieval key, but it also may be possible to provide text information as the retrieval key. In this case, an input keyword thereof and the similar image list are displayed.

As described above, according to the multimedia information arranging apparatus of the first embodiment, considering a group of related pieces of the media information including the image information, the text information and the audio information as an information set, it is possible to arrange such information sets in a preset information set arrangement space and display the media information according to a viewpoint with respect to this information set arrangement space.

(Second Embodiment)

A multimedia information arranging apparatus of a second embodiment of the present invention will be described. The multimedia information arranging apparatus of the second embodiment has a function of collecting pieces of media information including the image information, the text information and the audio information, analyzing the relationship between the collected pieces of the media information, grouping together related pieces of the media information so as to generate information sets, as a preprocessing before the information set arranging operation described in the first embodiment.

Figure 9:
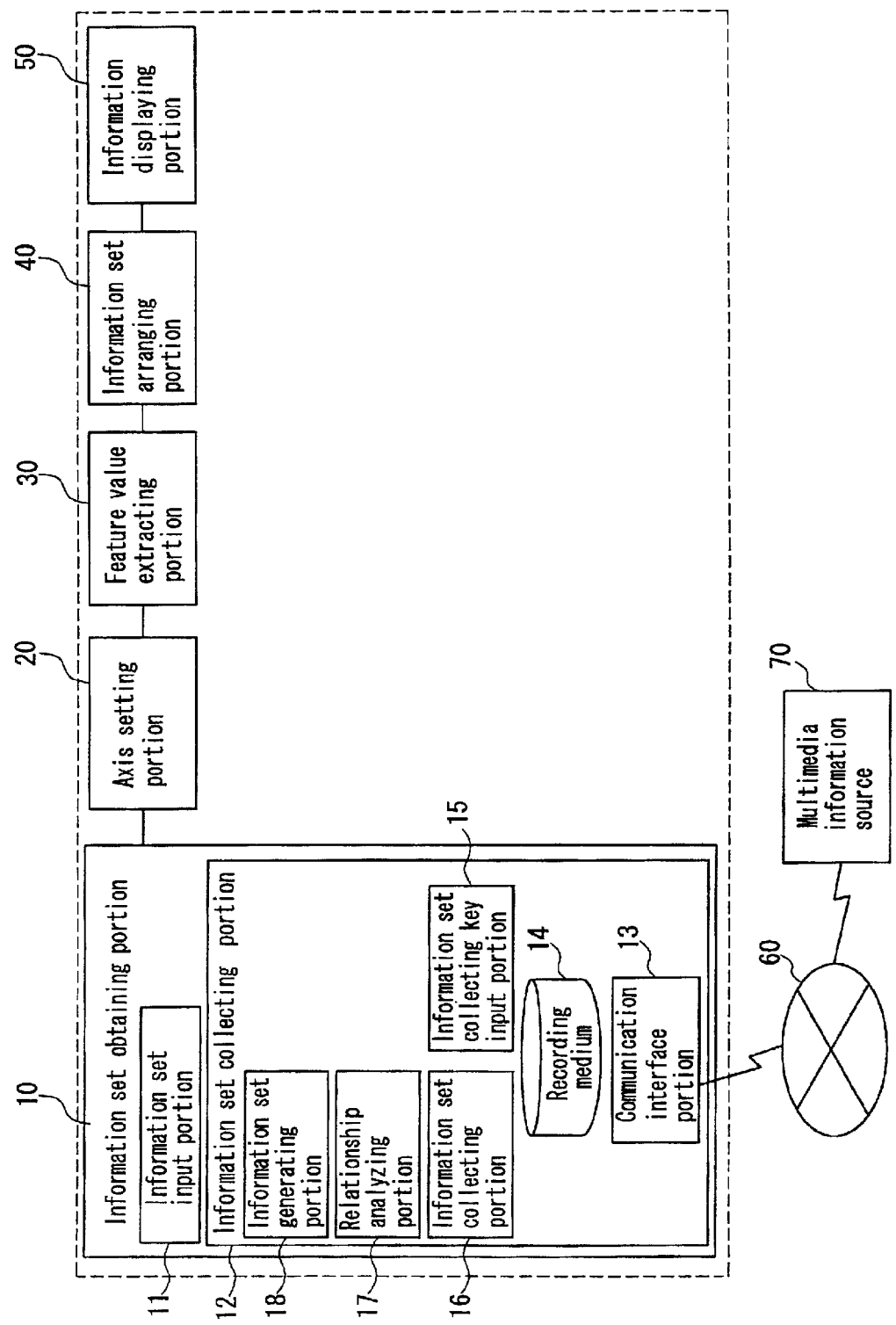
FIG. 9 is a drawing illustrating an exemplary configuration of a multimedia information arranging apparatus of a second embodiment according to the present invention.

First, FIG. 9 shows an exemplary configuration of the multimedia information arranging apparatus of the second embodiment. As shown in FIG. 9, in the multimedia information arranging apparatus of the second embodiment, elements other than the information set obtaining portion 10, namely, the axis setting portion 20, the feature value extracting portion 30, the information set arranging portion 40, the information displaying portion 50, the network 60 and the multimedia information source 70 may be the same as those in the exemplary configuration of the multimedia information arranging apparatus shown in FIG. 2 described in the first embodiment.

As shown in FIG. 9, in the multimedia information arranging apparatus of he second embodiment, the information set collecting portion 12 of the information set obtaining portion 10 includes an information collecting portion 16, a relationship analyzing portion 17 and an information set generating portion 18 in addition to the communication interface 13, the recording medium 14 and the information set collecting key input portion 15.

The information collecting portion 16 collects media information including image information, text information and audio information stored in the accessible multimedia information source 70 on the network 60. The media information can be collected automatically using a robot. When using a robot, a selection criterion is specified for collecting the media information from the multimedia information source 70 on the network 60. For example, the criterion is selected from a criterion group including keyword information, site information, link information and similarity information with respect to a specific information set. When providing the keyword information as the selection criterion, the media information without this keyword is not collected, so that the range can be limited. A text retrieval server is supplied with a keyword, so that the resultant feedback pages are retrieved.

When providing the site information and the link information as the selection criteria, the robot retrieves pages corresponding to a specified URL and thereafter and pages to which the URL is linked. In this manner, by circulating on the WWW and tracing the links, the robot traces a plurality of Web pages.

When providing the similarity information with respect to a specific information set as the selection criterion, it is possible to collect mainly the media information similar to media information in a certain the information set.

The information collecting portion 16 collects the image information, the text information and the audio information and stores them in the recording medium 14.

The relationship analyzing portion 17 analyzes the relationship between pieces of the media information collected from the multimedia information source by the information collecting portion 16. For example, when analyzing a text related to image information, in the case of a HTML document, the relationship analyzing portion 17 interprets a HTML structure while referring to texts around this image and information of the HTML, extracts an image part as the image information, extracts the texts around this image in the HTML document as the text information, and then analyzes a related degree of the texts near the image. It also is possible to analyze the related degree of the audio information in a similar manner. Also, in the case of a file other than the HTML, the relationship can be analyzed considering that the image information, the text information and the audio information in this file are highly related to each other, as long as they are integrated into one file such as a PDF file. In the cases of where plural pieces of the media information are not integrated into one file, as long as they are provided with the same keyword, it also is possible to analyze the relationship considering that the plural pieces of the media information are highly related to each other. If this keyword is not ordinary but distinctive, it also is possible to analyze the relationship considering that the related degree is still higher. Furthermore, it is needless to say that the related degree f plural pieces of the media information also can be determined by a user. As another example, in the case of a PDF file containing movie data including moving images and audio, a moving image part is extracted as the moving image information, audio data are extracted as the audio information, and texts around which the movie data are embedded are extracted as the text information, whereby these are associated with each other and formed into an information set.

The information set generating portion 18 edits a grouping of related pieces of the media information as an information set, the media information being of the same kind and different kinds, based on the analysis result by the relationship analyzing portion 17.

As described above, the multimedia information arranging apparatus of the second embodiment can collect pieces of the media information including the image information, the text information and the audio information, analyze the relationship between between the collected pieces of the media information, group together related pieces of the media information so as to generate information sets, as a preprocessing before the information set arranging operation described in the first embodiment. Since the operation of arranging information sets in the information set arrangement space using the generated information sets is the same as the described with reference to the flowchart of FIG. 3 in the first embodiment, the detailed description thereof is omitted here.

(Third Embodiment)

A multimedia information arranging apparatus of a third embodiment of the present invention will be described. The multimedia information arranging apparatus of the third embodiment applies a self-organizing map in the arrangement in the information set arrangement space based on the feature value of the media information by the information set arranging portion.

Figure 10:
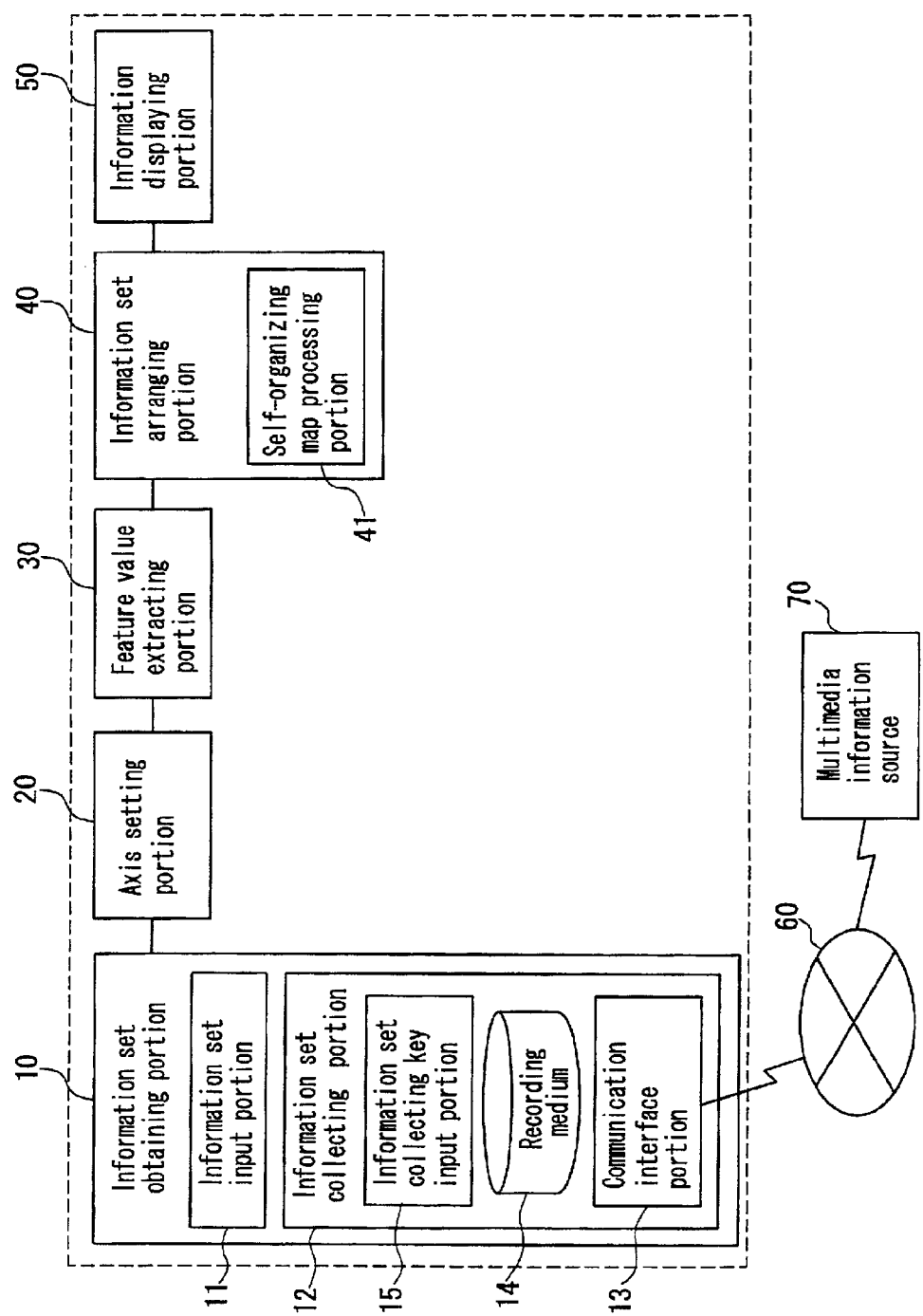
FIG. 10 is a drawing illustrating an exemplary configuration of a multimedia information arranging apparatus of a third embodiment according to the present invention.

FIG. 10 shows an exemplary configuration of the multimedia information arranging apparatus of the third embodiment. As shown in FIG. 10, the information set arranging portion 40 includes a self-organizing map processing portion 41. Elements other than the information set arranging portion 40, namely, the information set obtaining portion 10, the axis setting portion 20, the feature value exracting portion 30, the information displaying portion 50, the network 60 and the multimedia information source 70 may be the same as those in the exemplary configuration of the multimedia information arranging apparatus shown in FIG. 2 described in the first embodiment.

The self-organizing is a learning model without a teacher using a neural network. In the self-organizing map, a high-dimensional feature having similar feature vectors are arranged close to each other also in the low-dimensional space. This-organizing map is applied to the arranging operation of the media information, so as to arrange information sets sing the self-organizing map processing based on feature values extracted by the feature value extracting portion 30. The self-organizing map processing portion 41 executes the self-organizing map generating processing with respect to the feature value extracted by the feature value extracting portion 30. The information set arranging portion 40 of the present embodiment performs an arrangement in the information set arrangement space based on arrangement information obtained by the self-organizing map generated by the self-organizing map processing portion 41. It also is possible to combine the self-organizing map processing and a depth representation based on the feature value assigned to the Z axis (the depth direction). For example, the text information is decomposed into pieces of word frequency information, each frequency is vectorized, and then an axis position in the depth direction is determined based on this vector. As another example, when the Web is searched using a keyword, based on a related degree between the keyword and a Web page fed back from the text retrieval server, the information sets can be displayed in descending order of the related degree toward the depth and further they can be displayed by switching these methods.

As described above, in accordance with the multimedia information arranging apparatus of the third embodiment, by applying the self-organizing map processing, image that are considered to have similar contents can be arranged closer to each other and image that are considered to have dissimilar contents can be arranged far from each other in the space.

(Fourth Embodiment)

A multimedia information arranging apparatus of a fourth embodiment of the present invention will be described. The multimedia information arranging apparatus of the fourth embodiment is direction to contrivances for a displaying method and a browsing method of the information set arrangement space in which the information sets are arranged.

Figure 11:
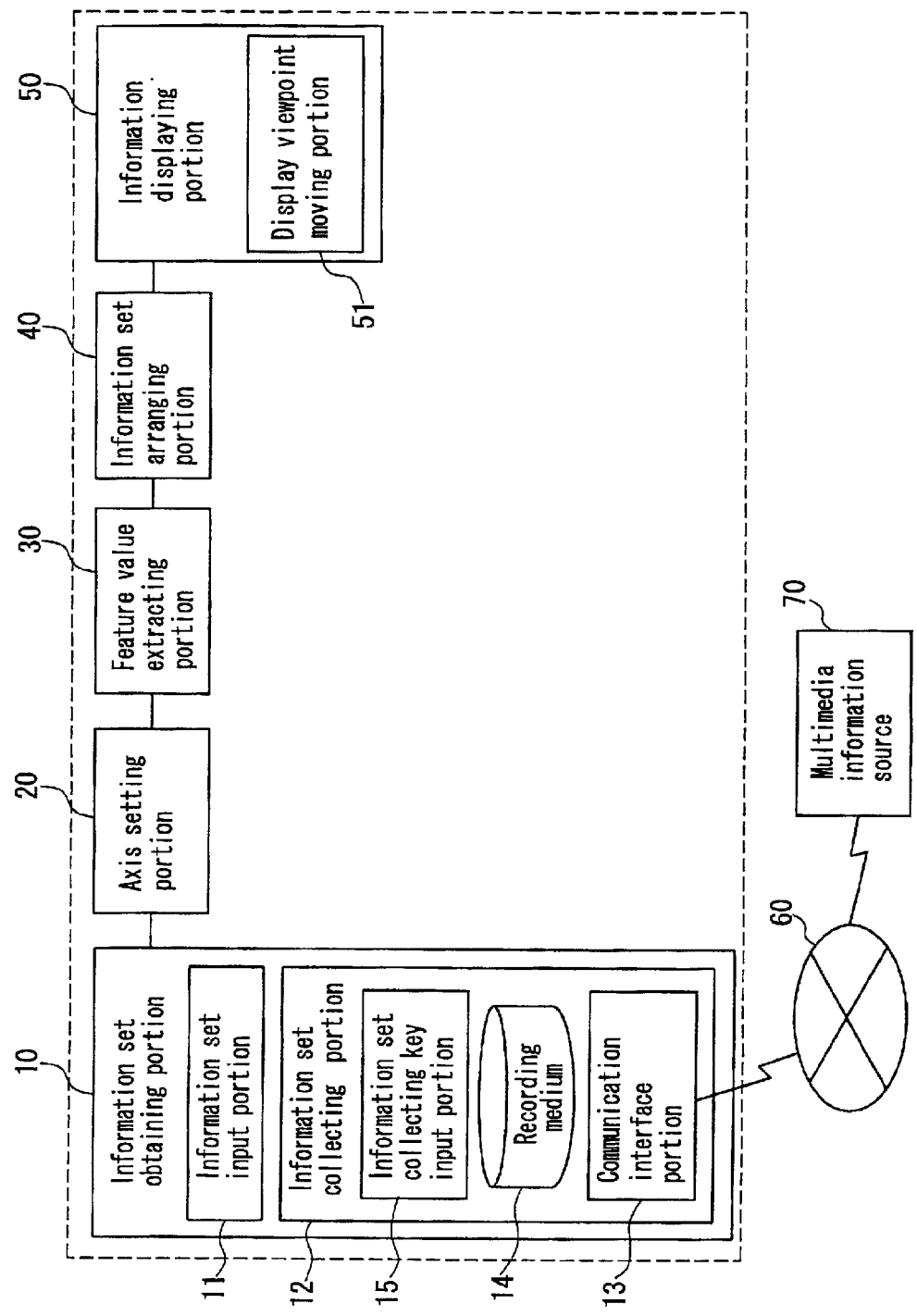
FIG. 11 is a drawing illustrating an exemplary configuration of a multimedia information arranging apparatus of a fourth embodiment according to the present invention.

FIG. 11 shows an exemplary configuration of the multimedia information arranging apparatus of the fourth embodiment. As shown in FIG. 11, the information displaying portion 50 includes a display viewpoint moving portion 51. Elements other than the information displaying portion 50, namely, the information set obtaining portion 10, the axis setting portion 20, the feature value extracting portion 30, the information set arranging portion 40, the network 60 and the multimedia information source 70 may be the same as those in the exemplary configuration of the multimedia information arranging apparatus shown in FIG. 2 described in the first embodiment.

In the information displaying portion 50, the display viewpoint moving portion 51 has a function of moving a position of setting a viewpoint for displaying the information set arrangement space in which the information sets are arranged by the information set arranging portion 40, the information displaying portion 50 displays the information set arrangement space seen from the display viewpoint set by the display viewpoint moving portion 51.

Figure 12:
FIG. 12 is a photograph showing a display example when a display viewpoint is made to advance toward a depth direction, in a multimedia information arranging apparatus of a fifth embodiment according to the present invention.

In the first embodiment, an example of the information set arrangement space displayed by the information displaying portion 50 has been illustrated by FIG. 4. The multimedia information arranging apparatus of the third embodiment makes it possible to regard the display viewpoint of FIG. 4 as default and change the display viewpoint dynamically by the display viewpoint moving portion 51. In other words, the display viewpoint virtually can move freely in the information set arrangement space in which the information sets are arranged, making it possible to display how they are arranged in the information set arrangement space seen from its moved position. In general, since a display screen basically is a two-dimensional plane, information sets located far in the depth tend to be difficult to see even though they can be displayed in perspective. However, the multimedia information arranging apparatus of the third embodiment can change the display viewpoint dynamically, thus making it possible to display the arrangement state of the information sets that a searcher wants to see more closely, so as to be close to the display screen surface according to the searcher's operation. FIG. 12 shows a display example when the display viewpoint is made to advance from the state shown in FIG. 4 toward a depth direction.

(Fifth Embodiment)

A multimedia information arranging apparatus of the fifth embodiment resets an information set arrangement space that has been displayed already by resetting an assignment of an attribute of a feature value to each information set arrangement space axis and rearranges each information set with respect to the reset information set arrangement space. Then, when displaying how the information sets are rearranged, the multimedia information arranging apparatus of the present embodiment moves a displayed piece of media information at predetermined intervals from the position at which the information set is located before the rearrangement to the position at which it is to be located thereafter.

The multimedia information arranging apparatus of the fifth embodiment also has a function of fixing an information set selected by a user to a specific position in the information set arrangement space specified by the user during the rearrangement and a function of fixing the information set selected by the user to the specific position while rearranging only the other information sets according to the information set arrangement space when rearranging each information set with respect to the information set arrangement space whose axis has been reset.

Figure 13:
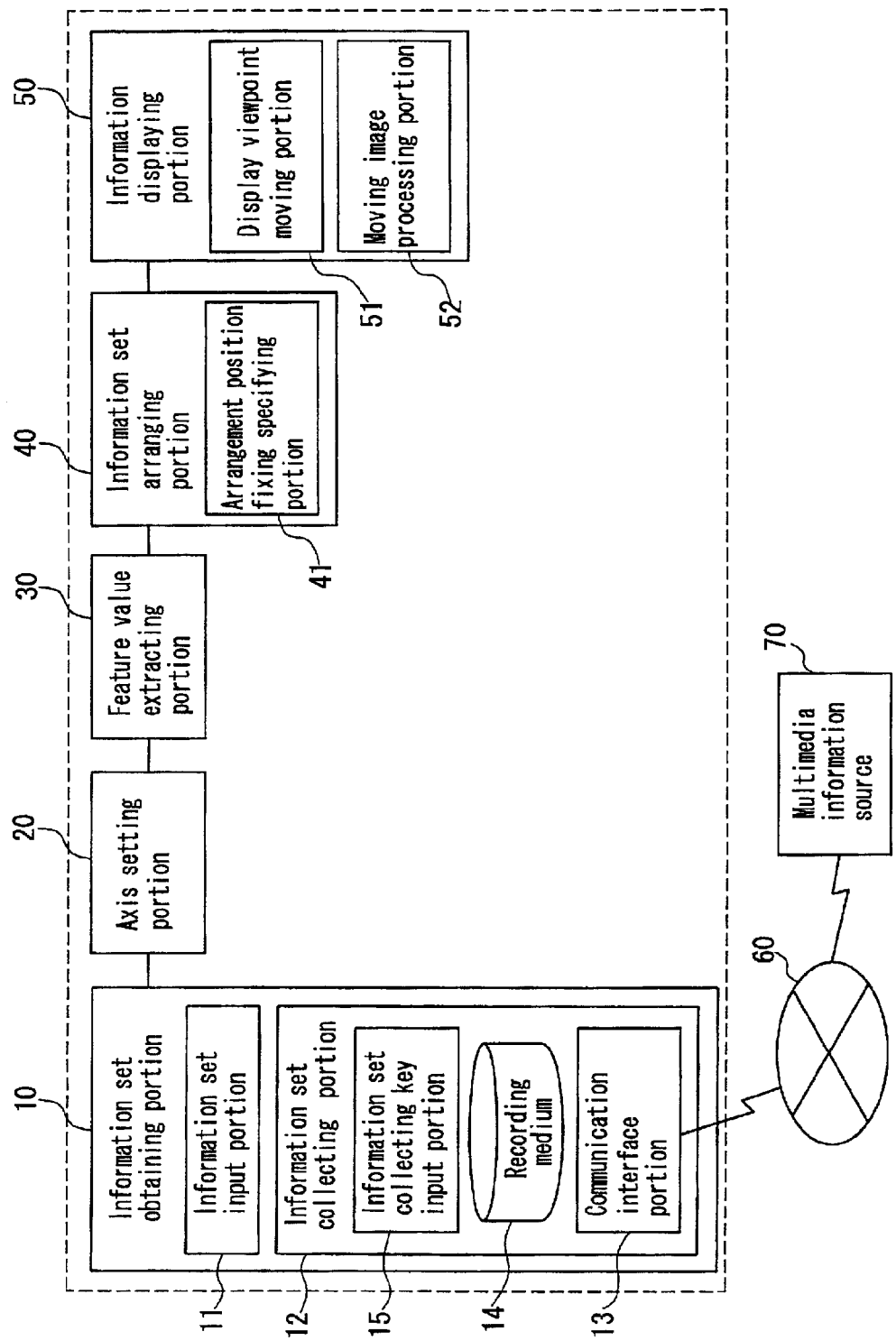
FIG. 13 is a drawing illustrating an exemplary configuration of the multimedia information arranging apparatus of the fifth embodiment according to the present invention.

FIG. 13 shows a simplified exemplary configuration of the multimedia information arranging apparatus according to the fifth embodiment. As shown in FIG. 13, the information displaying portion 50 includes a moving image processing portion 52. Furthermore, the information set arranging portion 40 includes an arrangement position fixing specifying portion 42. Elements other than the information set arranging portion 40 and the information displaying portion 50, namely, the information set obtaining portion 10, the axis setting portion 20, the feature value extracting portion 30, the network 60 and the multimedia information source 70 may be the same as those in the exemplary configuration of the multimedia information arranging apparatus shown in FIG. 2 described in the first embodiment.

When displaying how the information sets are rearranged in the information set arrangement space by resetting the axes, the moving image processing portion 52 of the information displaying portion 50 has a function of moving displayed media information in each information set at predetermined intervals from the position at which the media information is located before the rearrangement to the position at which it is to be located thereafter. For example, the function includes storing the positions of the information sets before the rearrangement, receiving a notification of the positions of the information sets after the rearrangement from the information set arranging portion 40, calculating a moving direction and a moving distance for each of the information sets based on both the positions at the coordinates and moving displayed pieces of the media information in each information set at predetermined intervals. The predetermined interval may be a predetermined moving distance regardless of the number of moving steps or an interval obtained by adjusting a moving distance so that the moving is completed within the predetermined number of steps.

The information set arranging portion 40 includes the arrangement position fixing specifying portion 42, and the user can specify via the arrangement position fixing specifying portion 42 that a specific information set is fixed to a specific position. When rearranging each information set with respect to the information set arrangement space whose axis has been reset, the information set arranging portion 40 has a function of fixing a selected information set to a specific position while rearranging only the other information sets according to the information set arrangement space.

The above-described rearranging functions of moving the displayed media information in the information set at predetermined intervals and fixing a specific information set at a specific position will be described with reference to specific examples of FIGS. 14 and 15.

Figure 14:
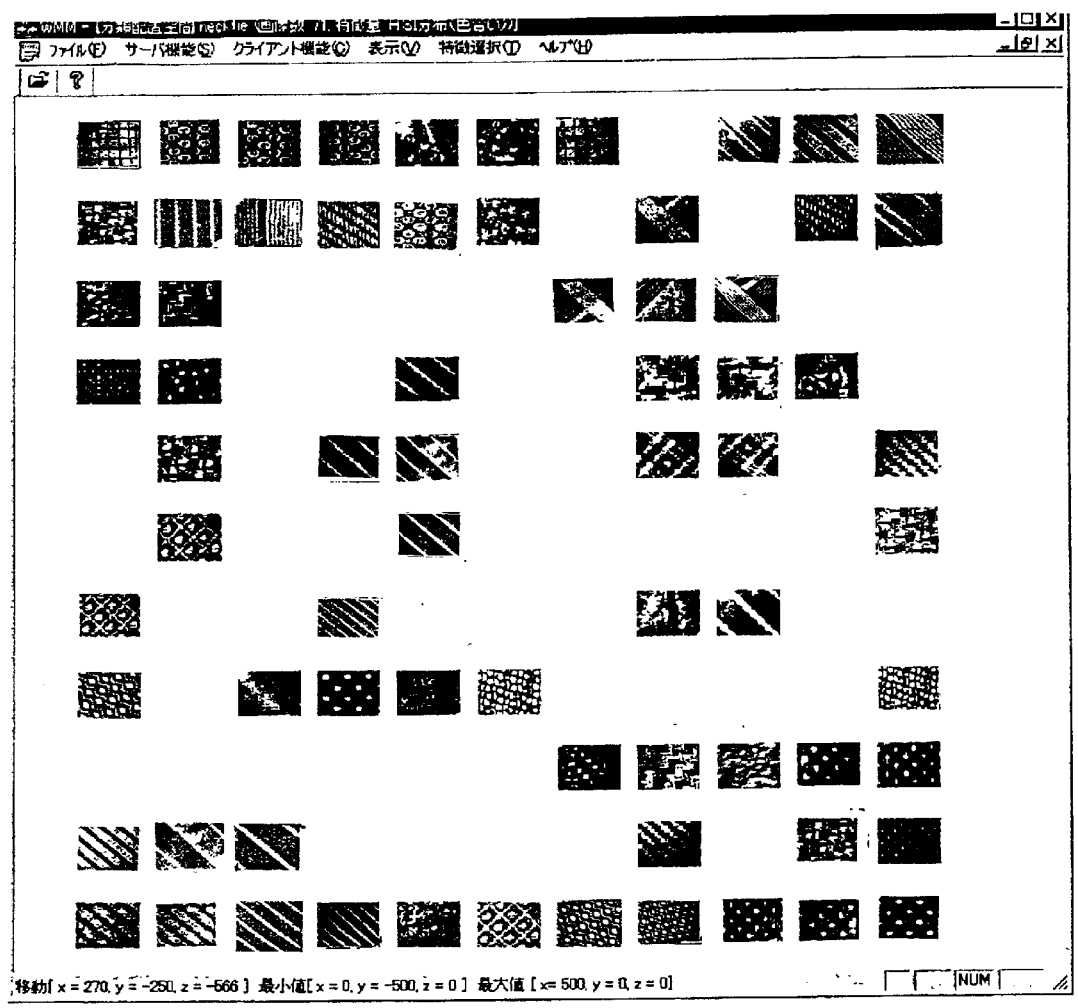
FIG. 14 is a view showing a specific example displayed by an information displaying portion 50 before rearrangement.
Figure 15:
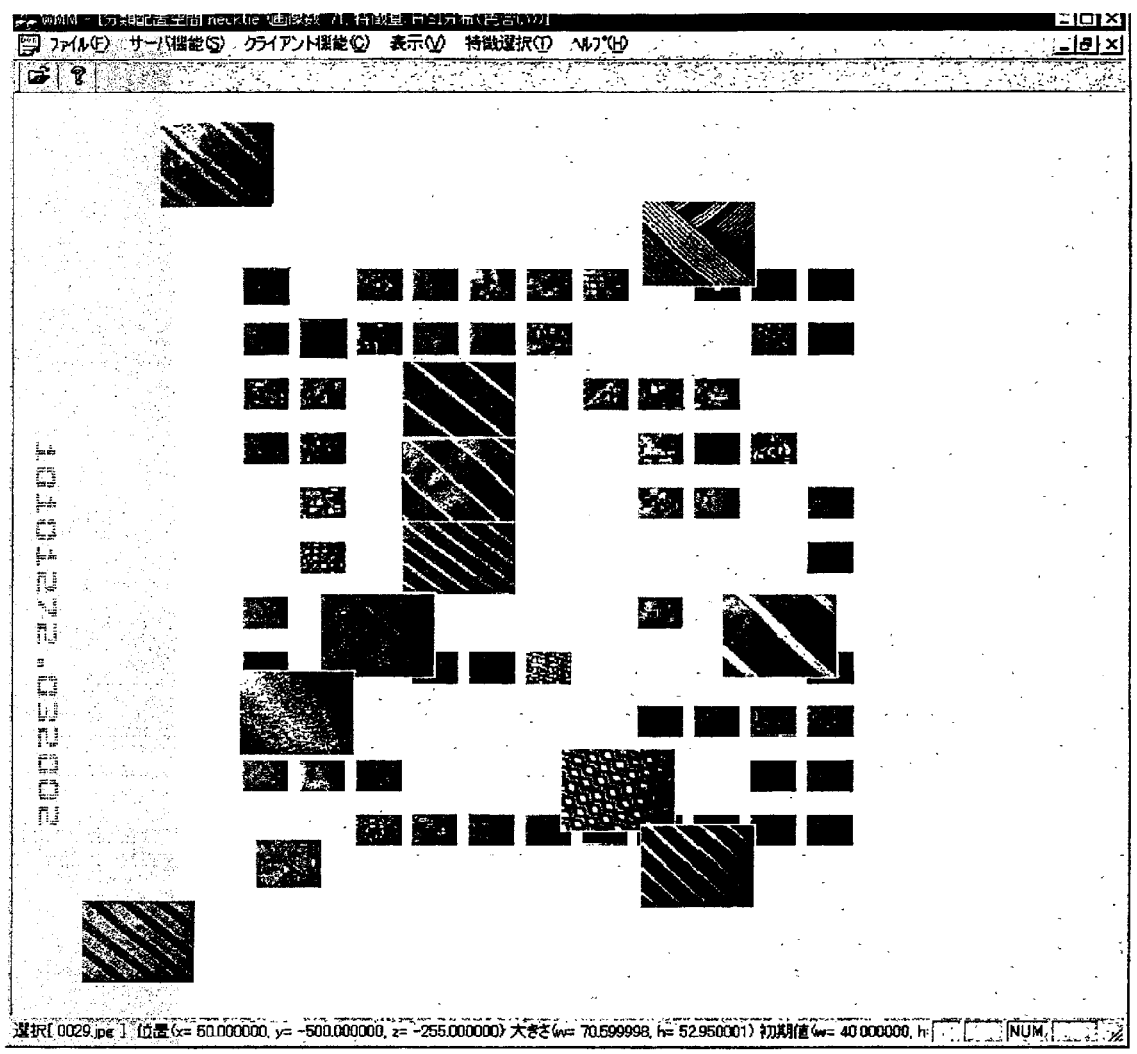
FIG. 15 is a view showing the specific example displayed by the information displaying portion 50 after the rearrangement.

First, FIG. 14 showing how the information sets are displayed in the information set arrangement space before the rearrangement will be described. In the information set arrangement space defined by X, Y and Z axes, the display screen of the information displaying portion 50 corresponds to the XY plane, while the depth direction of the screen corresponds to the Z axis. In the present embodiment, a HSI color histogram feature value is assigned to the axis in the XY plane direction by the axis setting portion 20, while no particular feature value is assigned to the Z axis and "0" value is assigned to all. In this initial information set arrangement space before the rearrangement, the information set arranging portion 40 arranges each information set on the plane of Z=0 according to the HSI color histogram of image media information contained in the information set. FIG. 14 shows an example displayed by the information displaying portion 50 before the rearrangement. In this example, each of the information sets contains image media information of a pattern of fabric such as neckties. Accordingly, as shown in FIG. 14, images of the information sets that have similar color information of the image media information are arranged close to each other in the XY plane.

The following is a description of how the rearrangement is carried out. Each information set contains various kinds of keyword information such as a keyword representing its content and has a similarity to a specific keyword as a feature value. In the present embodiment, the feature value of the similarity to a specific keyword is assigned to the Z axis by the axis setting portion 20. Subsequently, the information set arranging portion 40 arranges the information sets according to the information set arrangement space whose axis is reset by the axis setting portion 20. In this case, the information sets that have been arranged in the XY plane before the rearrangement are rearranged so that the feature value of the similarity to a specific keyword corresponds to the Z axis (the depth direction). FIG. 15 shows a specific example displayed by the information displaying portion 50 after the rearrangement. In the example of FIG. 15, a "striped pattern" was used for the specific keyword. The result of the rearrangement of FIG. 15 was that the information sets were arranged in the XY plane direction based on the color histogram and in the Z direction based on the feature value of the specific keyword of the "striped pattern," so that the images of the information sets having the striped pattern were displayed enlarged at the front. In this manner, it becomes possible to visually grasp both a color tendency and a classification of the presence or absence of the striped pattern with respect to the group of information sets at the same time. Moreover, all the information sets were arranged in the XY plane before the rearrangement, whereas the information sets with a higher similarity to a specific keyword are displayed closer to the front and the ones with a lower similarity are displayed further to the back after the rearrangement. Accordingly, the information sets related to a specific keyword can be made easier to see, whereas the ones not related very much thereto can be displayed small.

In the present embodiment, the moving image processing portion 52 moves displayed media information in each information set at predetermined intervals from the position at which the media information is located before the rearrangement to the position at which it is to be located thereafter. In other words, it displays media information displayed in each information set at predetermined intervals from the position before the rearrangement shown in FIG. 14 to the position thereafter shown in FIG. 15 as if the media information moves traceably by a human eye. The moving image processing portion 52 stores the positions of the information sets before the rearrangement shown in FIG. 14, receives the notification of the positions of the information sets after the rearrangement shown in FIG. 15, calculates the moving direction and the moving distance for each information set based on both the positions at the coordinates and moves the displayed media information in each information set at predetermined intervals.

Furthermore, as another specific example, when the axis setting portion 20 assigns a wavelet transform coefficient feature value instead of the color histogram feature value to the X, Y axes, the information set arranging portion 40 arranges the information sets in the new information set arrangement space, and the information displaying portion 50 displays pieces of the media information at predetermined intervals from the position before the rearrangement to the position thereafter as if they move traceably by human eyes, as described above.

Next, the following description is directed to a specific example of an rearrangement while a specific information set is fixed to a specific position, using the arrangement position fixing specifying portion 42 of the information set arranging portion 40.

In order to grasp the relationship between a specific information set and the other information sets, a user selects one information set or a plurality of information sets from the screen displaying these information sets via the arrangement position fixing specifying portion 42. For example, the user selects one information set and fixes it to the center, and then arranges the other information sets in the information set arrangement space by a self-organizing map method. It also is possible to select a plurality of information sets, for example, four information sets, and fix them to specific positions, for example, four corners of the screen and then to arrange the other information sets in the information set arrangement space by the self-organizing map method. By carrying out the arrangement while fixing the specific information sets to the specific positions as described above, it becomes easier to grasp visually the relationship between the selected information sets and the other information sets. For example, in the case where an axis of the information set arrangement space has a feature value of color information, when carrying out the arrangement while fixing an red image, a blue image, a yellow image and a green image to the four corners respectively, reddish images gather at the corner to which the red image is fixed and magenta images gather around the middle position between the position of the red image and that of the blue image. Therefore, it becomes easier to find individual images according to their hues.

Figure 16:
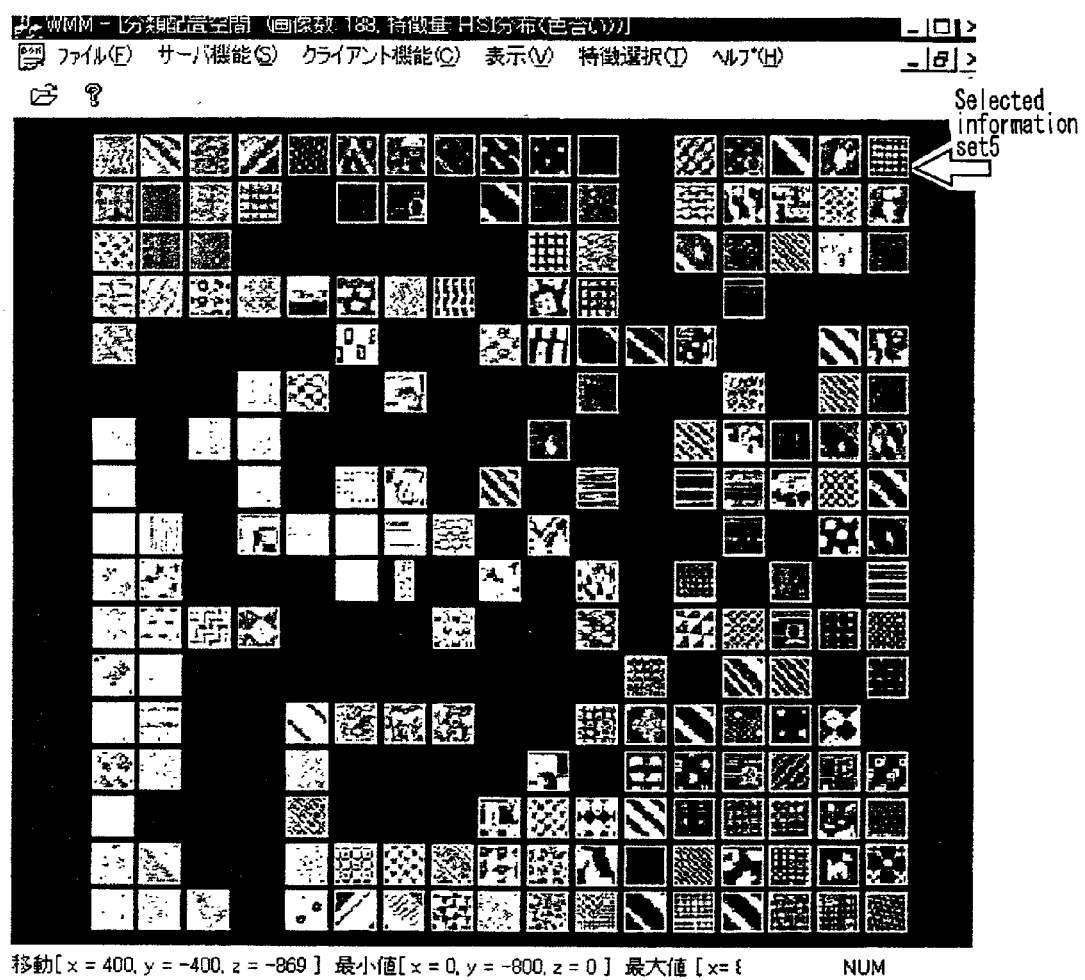
FIG. 16 is a view showing a state in which a certain information set is selected and specified using an arrangement position fixing specifying portion 42 before rearrangement.
Figure 17:
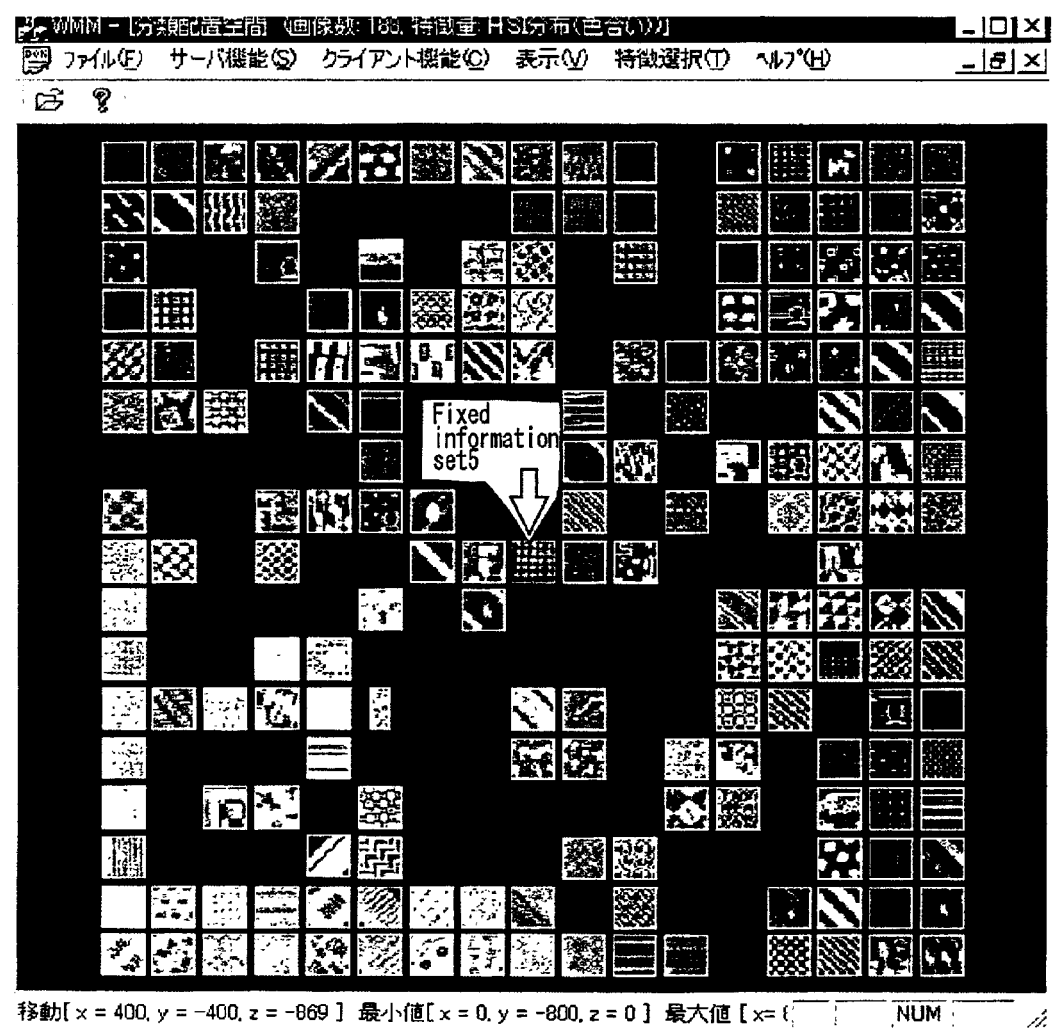
FIG. 17 is a view showing a state in which the information set selected and specified in FIG. 16 is fixed to a specific position (at the center of a screen) while other information sets are rearranged.

FIGS. 16 and 17 show a concept of the rearrangement while a specific information set is fixed to a specific position, using the arrangement position fixing specifying portion 42. FIG. 16 shows how the specific information set is selected and specified using the arrangement position fixing specifying portion 42 before the rearrangement, and FIG. 17 shows how the information set selected and specified in FIG. 16 is fixed to a specific position (the center of the screen) and the other information sets are rearranged. In FIG. 16, an information set 5 corresponds to the information set selected and specified by a user via the arrangement position fixing specifying portion 42. When the rearrangement is carried out according to color information while this information set 5 is fixed to the center, the information sets having a hue similar to that of the information set 5 gather around the center as shown in FIG. 17.

The above description is merely an example, and other than the case of the color information, information sets having a text similar to that of the selected information set can be arranged in the vicinity of the selected information set when, for instance, a feature value representing the presence of a specific word with respect to text information is assigned to the information set arrangement space axis.

This rearrangement function while fixing the specific information set to the specific position using the arrangement position fixing specifying portion 42 can be combined with that of moving the displayed media information in each information set at predetermined intervals. Also, during the rearrangement while fixing the specific information set to the specific position, each information set can be displayed in such a manner as to move to the position after the rearrangement at predetermined intervals.

With the above configuration, it is possible to reset the information set arrangement space and carry out a reclassification with a target information set being fixed to a specific position, allowing a visual recognition of how the arrangement position of each information set changes, thus improving the convenience of retrieval and classification operation of the information set.

(Sixth Embodiment)

A multimedia information arranging apparatus of the sixth embodiment of the present invention will be described. The multimedia information arranging apparatus of the sixth embodiment is obtained by constructing the above-described multimedia information arranging apparatus of the first to fifth embodiments by a client/server system via a computer network. Several patterns are possible depending on which elements are incorporated into a server computer and which elements are incorporated into a client computer among the elements in the configuration of the above-described multimedia information arranging apparatus of the first to fifth embodiments.

Figure 18:
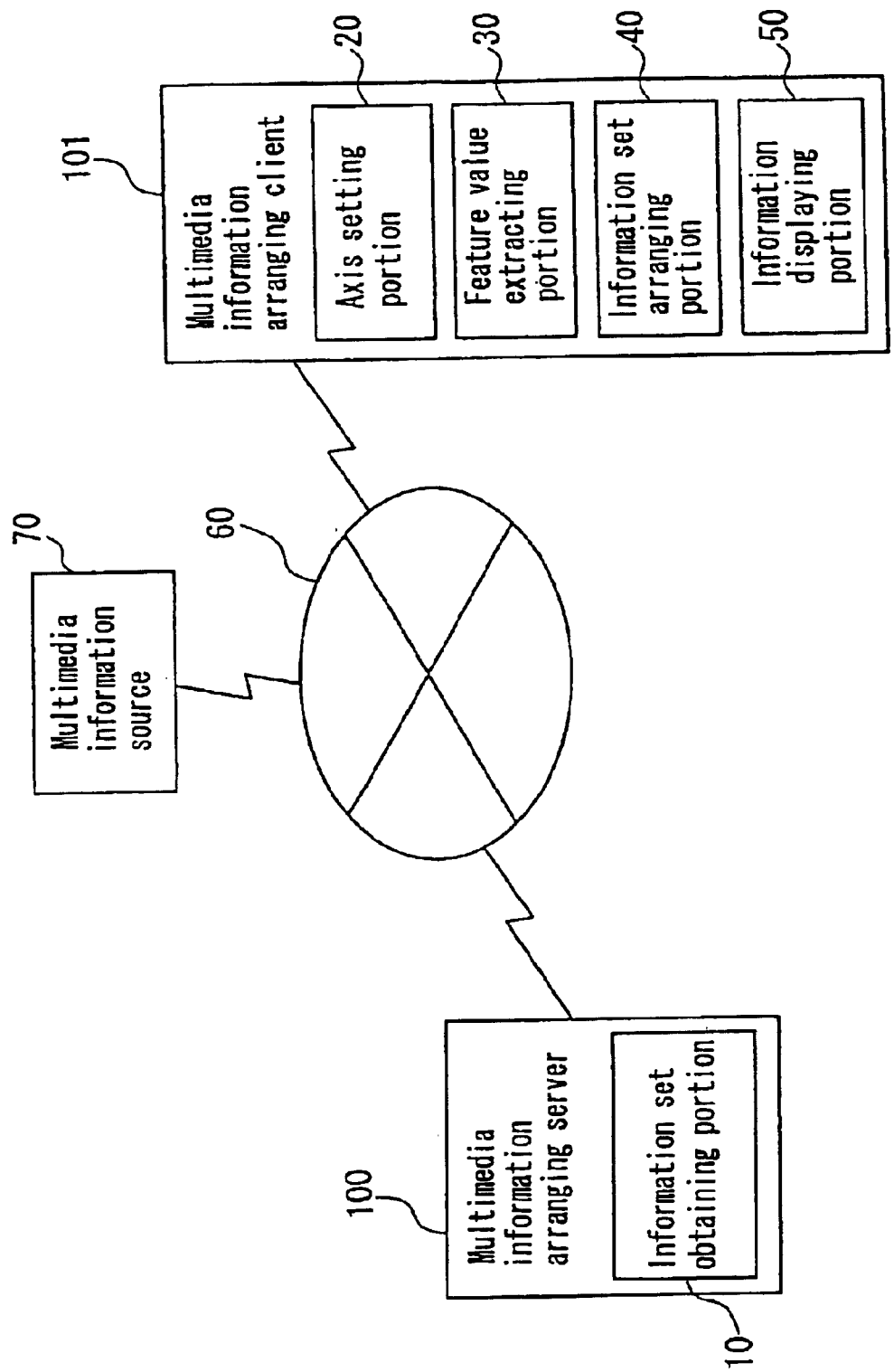
FIG. 18 is a drawing illustrating an example of constructing a multimedia information arranging apparatus of a sixth embodiment according to the present invention into a client/server configuration.

FIG. 18 illustrates an example of a client/server configuration in which a server computer 101 is provided with the information set obtaining portion 10 and a client computer 100 is provided with the axis setting portion 20, the feature value extracting portion 30, the information set arranging portion 40 and the information displaying portion 50.

Figure 19:
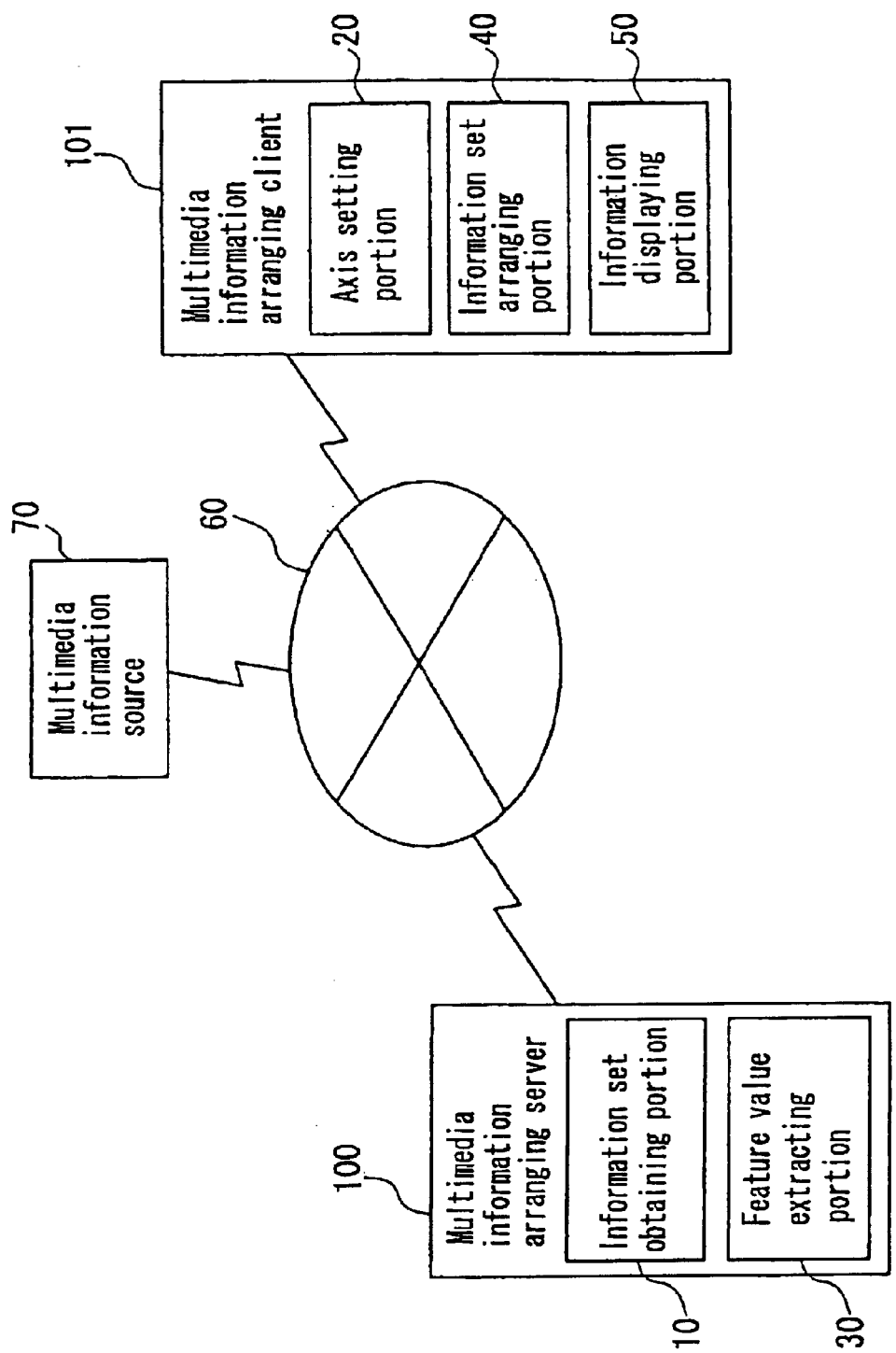
FIG. 19 is a drawing illustrating an example of constructing the multimedia information arranging apparatus of the sixth embodiment according to the present invention into a client/server configuration.

FIG. 19 illustrates a configuration in which the server computer 101 is provided with the information set obtaining portion 10 and the feature value extracting portion 30 and the client computer 100 is provided with the axis setting portion 20, the information set arranging portion 40 and the information displaying portion 50.

Figure 20:
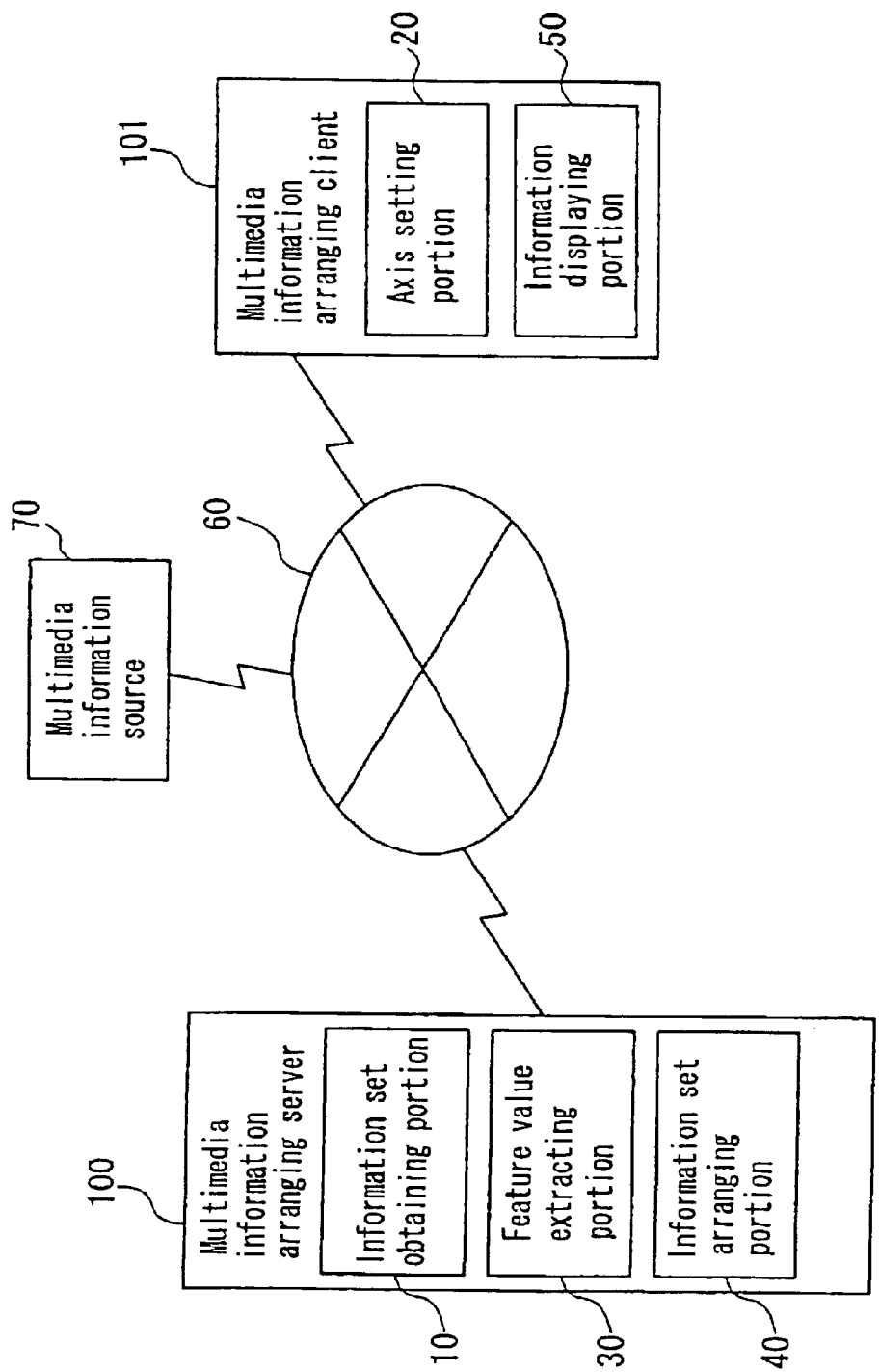
FIG. 20 is a drawing illustrating an example of constructing the multimedia information arranging apparatus of the sixth embodiment according to the present invention into a client/server configuration.

FIG. 20 illustrates a configuration in which the server computer 101 is provided with the information set obtaining portion 10, the feature value extracting portion 30 and the information set arranging portion 40 and the client computer 100 is provided with the axis letting portion 20 and the information displaying portion 50.

In each of the configurations of FIGS. 18 to 20 described above, there a e several methods for obtaining information sets. For example, there is a method in which the server computer 101 serves as a robot to collect/update automatically information sets having a specified content from the network in a periodic manner. FIGS. 18 to 20 all illustrate the information set obtaining portion 10 incorporated in the server computer 101, but there also is another method in which the information set collecting key input portion 15 is separated from the information set collecting portion 12 of the information set obtaining portion 10 and then provided in the client computer 100 (not shown in the figures), a user of the client computer 100 inputs an information set collecting key using the information set collecting key input portion 15, the inputted information set collecting key is sent to the information set obtaining portion 10, and the server computer 101 then collects the corresponding information sets dynamically from the network or the like using this information set collecting key.

As described above, the elements of the above-described multimedia information arranging apparatus of the first to fifth embodiments are separately provided in the server computer and the client computer, thereby constructing the multimedia information arranging apparatus of the present invention by the client/server system.

(Seventh Embodiment)

The seventh embodiment of the present invention is directed to an arranging method allowing a flexible arrangement, retrieval narrowing-down and switching to another retrieval aspect with respect to an information set using a multimedia information arranging operation using the above multimedia information arranging apparatus described in the first to sixth embodiments.

A conventional retrieval method includes providing a retrieval keyword, seeing a retrieval result and executing a retrieval again by narrowing down to a further restrictive retrieval keyword, or executing a retrieval again by replacing the retrieval keyword with a new one when the retrieval result is not the one desired. It can be said that the conventional retrieval method executes a trial-and-error retrieval by adjusting retrieval keywords.

However, the trial and error is only carried out with respect to one feature value as text information, which is a retrieval keyword.

In the case of carrying out a retrieval using a certain feature value of a certain information set as a retrieval key, the information set arranging method of the seventh embodiment includes, after seeing the retrieval result, executing one retrieval after another by using a feature value of media information that is different from the above media information or by specifying a feature value that is different from the above feature value of the same media information. In other words, this method includes setting an assignment of a feature value extracted from each media information to each information set arrangement space axis so as to set the information set arrangement space having one or more axes, specifying a feature value that is different from the one used for the arrangement with respect to the arranged information set so as to reset the assignment to the information set arrangement space, rearranging the information sets in the information set arrangement space based on the resetting, and then setting the axis of the information set arrangement space and arranging the information sets in the information set arrangement space repeatedly while switching feature values to be used.

With this method, after seeing the retrieval result, which is an arrangement of the information sets obtained by a certain feature value, it is possible to try arranging of the information sets using a feature value with a completely different aspect. Thus, there arises a possibility of discovering new information that a searcher has never expected.

For example, in order to look into the design of well-selling women's bags using the multimedia information arranging apparatus described in the first embodiment, information sets are collected by specifying a keyword of "bag," and then arranged in the information set arrangement space by assigning a wavelet transform coefficient feature value to the X axis, a feature value representing the presence of a keyword of woman to the Y axis and a feature value representing the presence of a keyword of bag to the Z axis as the information set arrangement space axes, so that a display result is obtained. When a searcher discovers an image of a woman with a white-haired dog carrying a whitish bag among the displayed pieces of the image information, for example, the searcher might guess that "a woman going out with a dog tends to carry a bag with a color similar to the dog." In order to confirm this guess, a feature value having a different aspect is assigned to the information set arrangement space axis, thus resetting axis, rearranging and redisplaying the information sets. For example, the combination of a feature value representing the presence of the keyword of "bag" and a feature value representing the presence of the keyword of "dog" is assigned to the X axis (in other words, the presence of both the keywords of bag and dog is specified), a color histogram feature value is assigned to the Y axis, thus resetting the information set arrangement space and rearranging the information sets, and in this manner, a retrieval with a new aspect becomes possible. It is possible to see the obtained result of displaying the arrangement of the image information and use it for judging whether or not the guess that a woman going out with a dog tends to carry a bag with a color similar to the dog is true.

Furthermore, in the case where the information set is accompanied by other media information, for example, personal information, as text information as described in the first embodiment, when each piece of the image information is clicked with a pointing device, a new tendency, for example, that a woman taking along a bag and a dog with similar colors tends to have a high annual income might be discovered. Moreover, in the case where audio information of a dog's bark is contained in the information set as audio information associated with the image information, when a voice frequency feature value of the audio information is assigned to one of the information set arrangement space axes so as to carry out rearrangement and redisplaying, there might be a discovery from another aspect. Such a discovery may be, for example, the tendency that a dog has a high voice, that is, a dog is small enough to be kept inside when many pieces of the image information are arranged at coordinates with high voice frequencies. In other words, a tendency that "a woman going out with a small dog matches the color of a bag with that of her dog" might be discovered.

As described above, in accordance with the information set arranging method of the seventh embodiment, after seeing the retrieval result, which is an arrangement of the information sets obtained by a certain feature value, it is possible to try arranging the information sets using a feature value with a completely different aspect, thus discovering new information that a searcher has never expected.

(Eighth Embodiment)

Figure 21:
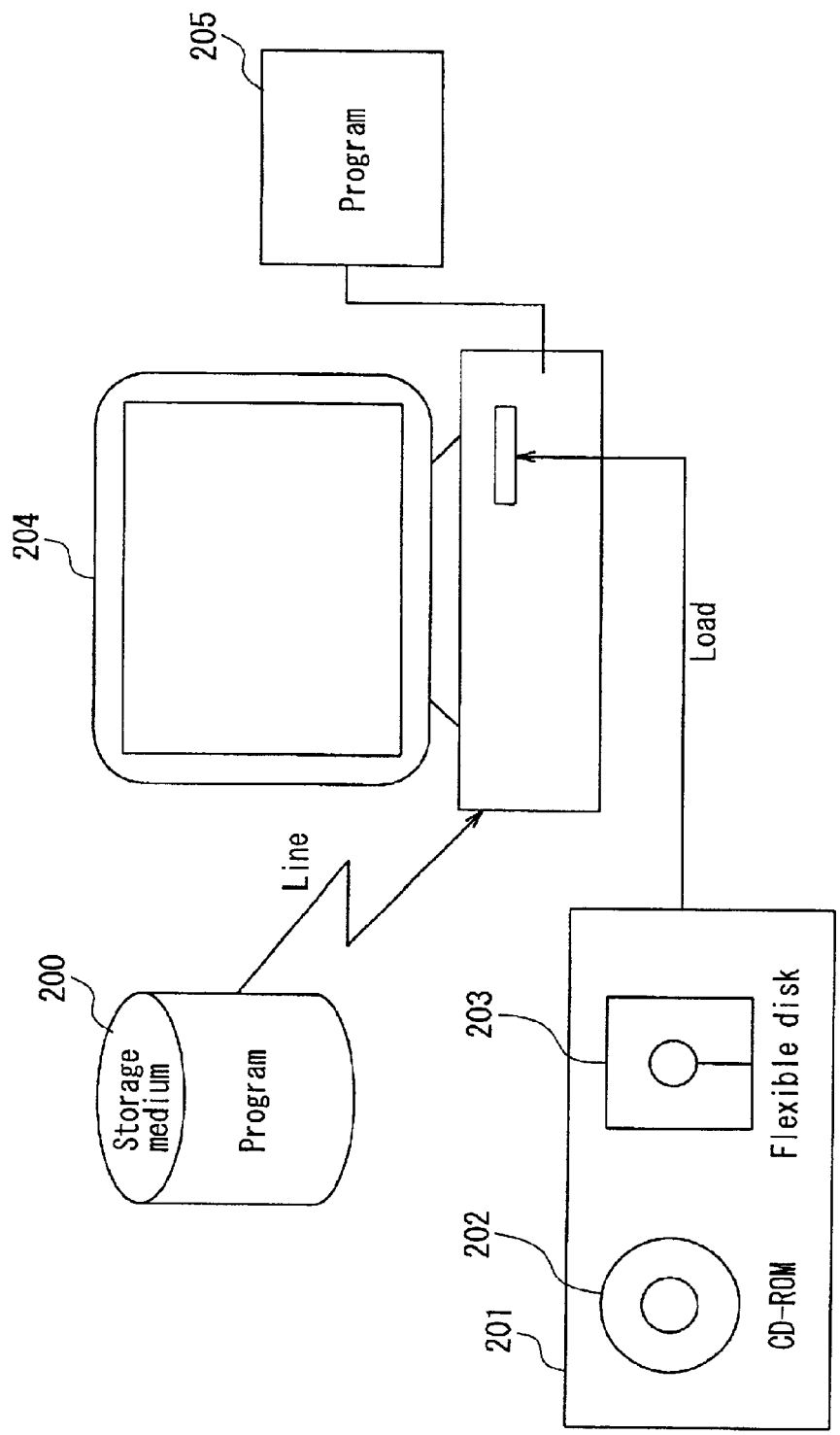
FIG. 21 is a drawing illustrating an exemplary recording medium on which a program containing, as its processing operation, a processing content of a multimedia information arranging apparatus of a seventh embodiment according to the present invention is recorded.

The multimedia information arranging apparatus according to the present invention can be constructed by computers of several types by recording a program, containing the processing operations for realizing the operations explained in the above embodiments, on a computer-readable recording medium. The recording medium, on which the program providing the processing operations realizing the multimedia information arranging apparatus according to the present invention is recorded, can be not only a portable recording medium 201 such as a CD-ROM 202 or a flexible disk 203, but also a recording medium 200 in a recording apparatus on the network or a recording medium 205 such as a hard disk or a RAM in a computer, as illustrated by an example of the recording media shown in FIG. 21. When executing the program, the program is loaded into a computer 204 and executed in its main memory.

Industrial Applicability

According to the multimedia information arranging apparatus of the present invention, considering a group of related pieces of the media information including the image information, the text information and the audio information as an information set, it is possible to arrange such information sets in a preset information set arrangement space and display the media information according to a viewpoint with respect to this information set arrangement space.

Also, according to the multimedia information arranging apparatus of the present invention, with the information set generating portion, it is possible to collect pieces of the media information including the image information, the text information and the audio information, analyze the relationship between the collected pieces of the media information, group together related pieces of the media information so as to generate information sets, as a preprocessing before the information set arranging operation.

According to the multimedia information arranging apparatus of the present invention, with the self-organizing map processing portion, it is possible to apply a self-organizing map operation so as to arrange the information sets in the information set arrangement space.

Furthermore, according to the multimedia information arranging apparatus of the present invention, with the display viewpoint moving portion, it is possible to change the display viewpoint dynamically and display the arrangement state of the information sets that a searcher wants to see more closely, so as to be close to the display screen surface according to the searcher's operation.

Moreover, according to the multimedia information arranging apparatus of the present invention, it is possible to reset the information set arrangement space and carry out a reclassification with a target information set being fixed to a specific position, allowing a visual recognition of how the arrangement position of each information set changes, thus improving convenience of retrieval and classification operation of the information set.

In addition, according to the information set arranging method of the present invention, after seeing the retrieval result, which is an arrangement of the information sets obtained by a certain feature value, it is possible to try arranging the information sets using a feature value with a completely different aspect, thus discovering new information that a searcher has never expected.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended be embraced therein.

What is claimed is:

1. A multimedia information arranging apparatus comprising:
    a computer, comprising an information set obtaining portion for obtaining pieces of media information in units of information sets, which are formed by grouping together the pieces of media information that are related to a same target, the media information being of a same kind and different kinds, from among a group of pieces of media information including image information, text information and audio information;
    an axis setting portion for assigning an attribute of a feature value extracted from the obtained pieces of media information contained in the information sets to an axis of a space in which a group of the information sets is arranged and setting an information set arrangement space with one or more axes;
    a feature value extracting portion for extracting a component of the feature value from the pieces of media information in the information sets;
    an information set arranging portion for arranging the information sets in the information set arrangement space based on the attribute of the feature value of the pieces of media information contained in the information sets and the component of his feature value; and
    an information displaying portion for displaying pieces of media information corresponding to a viewpoint with respect to the information set arrangement space, from among the pieces of media information of the information sets arranged in the information set arrangement space.

2. The multimedia information arranging apparatus according to claim 1, wherein, in the axis setting portion, a plurality of the attributes of the feature values are assigned in combination to one axis of the space or one attribute of the feature value is assigned to a plurality of the axes.

3. The multimedia information arranging apparatus according to claim 2, wherein the axis setting portion has an axis resetting function of resetting an assignment of the attribute of the feature value to each of the axes of the information set arrangement space and resetting the information set arrangement space with one or more axes, and
    The feature value extracting portion extracts the component of the feature value based an the axis-resetting by the axis setting portion, the information set arranging portion arranged the information sets in the information set arrangement space based on the component of the extracted feature value, and the information displaying portion displays the pieces of media information corresponding to the viewpoint with respect to the reset information set arrangement space.

4. The multimedia information arranging apparatus according to claim 1 or, wherein the axis setting portion has an axis resetting function of resetting an assignment of the attribute of the feature value to each of the axes of the information set arrangement space and resetting the information set arrangement space with one or more axes, and
    the feature value extracting portion extracts the component of the feature value based on the axis-resetting by the axis setting portion, the information set arranging portion arranges the information sets in the information set arrangement space based on the component of the extracted feature value, and the information displaying portion displays the pieces of media information corresponding to toe viewpoint with respect to the reset information set arrangement space.

5. The multimedia information arranging apparatus according to claim 1, wherein the information set obtaining portion comprises an information collecting portion for collecting the pieces of media information including the image information, the text information and the audio information, a relationship analyzing portion for analyzing a relationship between the collected pieces of media information and an information set generating portion for grouping and editing the related pieces of media information, which is of the same kind or the different kinds, as the information sets.

6. The multimedia information arranging apparatus according to claim 5, wherein the information collecting portion collects the pieces of media information according to a specified selection criterion when collecting the pieces of media information from a multimedia information group, and the selection criterion is specified by being selected from a criterion group including keyword information, site information, link information and similarity information with respect to a specific information set.

7. The multimedia information arranging apparatus according to claim 1, wherein the feature value is selected from a DCT coefficient feature value with respect to the image information, a wavelet transform coefficient feature value with respect to the image information, a HSI color histogram feature value with respect to the image information, a feature value representing a presence of a specific word with respect to the text information, a feature value of how many times a specific word is used with respect to the text information, a voice frequency feature value with respect to the audio information, an amplitude feature value with respect to the audio information and a time change feature value with respect to the audio information.

8. The multimedia information arranging apparatus according to claim 1, wherein the information set arranging portion comprises a self-organizing map processing portion for utilizing a local interaction and performing a self-organization by learning, and the information set arranging portion arranges the information sets based on the feature value extracted by the feature value extracting portion using a self-organizing map processing by the self-organizing map processing portion.

9. The multimedia information arranging apparatus according to claim 1, wherein the information displaying portion comprises a display viewpoint moving portion having a function of moving a position of setting the viewpoint for displaying the information set and the information set arrangement space, and the information displaying portion displays the information set arrangement space, in which the information sets are arranged, based on the position of the viewpoint set by the display viewpoint moving portion.

10. The multimedia information arranging apparatus according to claim 1, wherein the axis setting portion resets an assignment of the attribute of the feature value to each of the axis of the information set arrangement space and resets the information set arrangement space that has been displayed already, the information set arranging portion rearranges the information sets in the reset information set arrangement space, and when displaying how the information sets are rearranged, the information displaying portion moves the displayed pieces of media information at predetermined intervals from a position at which the information sets have been located before the rearrangement to a position at which they are to be located thereafter.

11. The multimedia information arranging apparatus according to claim 10, wherein the information set arranging portion has a function of fixing an information set selected by a user to a specific position in an information set arrangement space specified by the user, and a function of fixing the information set selected by the user to the specific position while rearranging only the other information sets according to the information set arrangement space, when rearranging the information sets with respect to the information set arrangement space with reset axis.

12. The multimedia information arranging apparatus according to claim 1, wherein the information set arranging portion has a function of fixing an information set selected by a user to a specific position in an information set arrangement space specified by the user, and a function of fixing the information set selected by the user to the specific position while rearranging only the other information sets according to the information set arrangement space, when rearranging the information sets with respect to the information set arrangement space with reset axis.

13. A computer-readable recording medium storing a processing program for realizing a multimedia information arranging apparatus for arranging and displaying information sets, each of which is a group of related pieces of media information including image information, text information and audio information, in an information set arrangement space, the processing program comprising:

an information set obtaining operation for obtaining the pieces of media information in units of the information sets, each formed by associating with each other the related pieces of media information including the image information, the text information and the audio information, the media information being of a same kind and different kinds;

an axis setting operation for assigning an attribute of a feature value extracted from the obtained pieces of media information contained in the information sets to an axis of a space in which a group of the information sets is arranged and setting an information set arrangement space with one or more axes;

a feature value extracting operation for extracting a component of the feature value from the pieces of media information in the information sets;

an information set arranging operation for arranging the information sets in the information set arrangement space based on the extracted component of the feature value; and an information displaying operation for displaying pieces of media information corresponding to a viewpoint with respect to the information set arrangement space, from among the pieces of media information of the information sets arranged in the information set arrangement space.

14. An information set computer-implemented arranging method comprising:

obtaining pieces of media information in units of information sets, each formed by associating with each other related pieces of media information including image information, text information and audio information, the media information being of a same kind and different kinds;

assigning an attribute of a feature value extracted from the obtained pieces of media information contained in the information sets to an axis of a space in which a group of the information sets is arranged and setting an information set arrangement space with one or more axes;

extracting a component of the feature value from the pieces of media information in the information sets;

arranging the information sets in the information set arrangement space based on the attribute of the feature value of the pieces of media information contained in the information sets and the component of this feature value;

specifying a feature value that is different from the feature value with respect to the arranged information sets, resetting an assignment to each of the axis of the information set arrangement space, and rearranging the information sets in the information set arrangement space based on the resetting; and setting the axis of the information set arrangement space and arranging the information sets in the information set arrangement space repeatedly while switching feature values to be used.

* * * * *

UNITED STATES PATENT AND TRADEMARK OFFICE
CERTIFICATE OF CORRECTION

PATENT NO. : 6,948,123 B2  Page 1 of 1
APPLICATION NO. : 10/101272
DATED : September 20, 2005
INVENTOR(S) : Susumu Endou et al.

It is certified that error appears in the above-identified patent and that said Letters Patent is hereby corrected as shown below:

On the title page, item [56]:

First Page, Column 2 (Foreign Patent Documents), Line 3, below "JP 9-259130" insert - - 9-114859  05/02/97  Japan - -.
Column 26, Line 9, delete "his" and insert - - this - - therefor.
Column 26, Line 26, delete "The" and insert - - the - - therefor.
Column 26, Line 27, delete "an" and insert - - on - - therefor.
Column 26, Line 29, delete "arranged" and insert - - arranges - - therefor.
Column 26, Line 36, after "claim 1" delete "or".
Column 26, Line 47, delete "toe" and insert - - the - - therefor.

Signed and Sealed this

Fifteenth Day of August, 2006

JON W. DUDAS
*Director of the United States Patent and Trademark Office*